US009633651B2

(12) United States Patent
Habets et al.

(10) Patent No.: US 9,633,651 B2
(45) Date of Patent: Apr. 25, 2017

(54) APPARATUS AND METHOD FOR PROVIDING AN INFORMED MULTICHANNEL SPEECH PRESENCE PROBABILITY ESTIMATION

(71) Applicant: Fraunhofer-Gesellschaft zur Förderung der angewandten Forschung e.V., München (DE)

(72) Inventors: Emanuel Habets, Spardorf (NL); Maja Taseska, Erlangen (DE)

(73) Assignee: FRAUNHOFER-GESELLSCHAFT ZUR FÖRDERUNG DER ANGEWANDTEN FORSCHUNG E.V., Belgium (DE)

( * ) Notice: Subject to any disclaimer, the term of this patent is extended or adjusted under 35 U.S.C. 154(b) by 0 days.

(21) Appl. No.: 14/637,241

(22) Filed: Mar. 3, 2015

(65) Prior Publication Data

US 2015/0310857 A1 Oct. 29, 2015

Related U.S. Application Data

(63) Continuation of application No. PCT/EP2012/067124, filed on Sep. 3, 2012.

(51) Int. Cl.
*G10L 15/12* (2006.01)
*G10L 15/14* (2006.01)
(Continued)

(52) U.S. Cl.
CPC ............. *G10L 15/14* (2013.01); *G10L 25/78* (2013.01); *G10L 21/0208* (2013.01); *G10L 21/0264* (2013.01); *G10L 2021/02166* (2013.01)

(58) Field of Classification Search
CPC ..... G10L 25/78; G10L 21/0208; G10L 15/20; G10L 2021/02165; G10L 2021/02166;
(Continued)

(56) References Cited

U.S. PATENT DOCUMENTS 5,890,108 A * 3/1999 Yeldener ................ G10L 19/18
704/200.1
5,924,066 A * 7/1999 Kundu .................. G10L 15/142
704/232

(Continued)

FOREIGN PATENT DOCUMENTS

CN 1679083 A 10/2005
CN 1985301 A 6/2007
(Continued)

OTHER PUBLICATIONS

International Preliminary Report on Patentability from corresponding appl. No. PCT/EP2012/067124, dated Mar. 5, 2015.
(Continued)

*Primary Examiner* — Vijay B Chawan
(74) *Attorney, Agent, or Firm* — Koppel, Patrick, Heybl & Philpott

(57) ABSTRACT

An apparatus for providing a speech probability estimation is provided. The apparatus includes a first speech probability estimator for estimating speech probability information indicating a first probability on whether a sound field of a scene includes speech or on whether the sound field of the scene does not include speech. Moreover, the apparatus includes an output interface for outputting the speech probability estimation depending on the speech probability information. The first speech probability estimator is configured to estimate the first speech probability information based on at least spatial information about the sound field or spatial information on the scene.

19 Claims, 18 Drawing Sheets

(51) Int. Cl.
*G10L 25/78* (2013.01)
*G10L 21/0264* (2013.01)
*G10L 21/0208* (2013.01)
*G10L 21/0216* (2013.01)

(58) Field of Classification Search
CPC . G10L 21/0232; G10L 21/0272; G10L 15/02; G10L 15/142; G10L 15/183; G10L 15/197; G10L 19/0204; G10L 19/10; G10L 19/18; G10L 25/18; H04R 3/005; H04R 2201/403; H04R 2225/43; H04R 2430/20; H04R 25/505; H04B 7/0854; G06K 9/623
USPC .... 704/226–228, 233, 201, 200.1, 206, 208, 704/215, 216, 217, 223, 225, 236, 239, 704/240, 254, 256, 257; 381/92, 94.1; 455/114.2, 296, 501, 570, 67.13; 702/194
See application file for complete search history.

(56) References Cited

U.S. PATENT DOCUMENTS

| | | | | |
|---|---|---|---|---|
| 5,970,446 | A * | 10/1999 | Goldberg | G10L 15/20 704/233 |
| 6,374,216 | B1 * | 4/2002 | Micchelli | G10L 15/063 704/231 |
| 6,609,094 | B1 * | 8/2003 | Basu | G06K 9/623 704/239 |
| 7,295,972 | B2 * | 11/2007 | Choi | G10L 21/0208 704/226 |
| 7,626,889 | B2 * | 12/2009 | Seltzer | G01S 3/86 367/125 |
| 8,346,545 | B2 * | 1/2013 | Jung | G10L 15/20 704/215 |
| 8,452,592 | B2 * | 5/2013 | Takatani | H04S 1/007 704/226 |
| 8,504,117 | B2 * | 8/2013 | Fox | G10L 21/0208 381/92 |
| 8,831,943 | B2 * | 9/2014 | Emori | G10L 15/197 704/251 |
| 8,935,164 | B2 * | 1/2015 | Turnbull | G10L 19/10 704/216 |
| 2003/0018475 | A1 | 1/2003 | Basu et al. | |
| 2003/0101055 | A1 | 5/2003 | Son et al. | |
| 2005/0137864 | A1 * | 6/2005 | Valve | G10L 21/0364 704/227 |
| 2005/0267745 | A1 * | 12/2005 | Laaksonen | G10L 25/78 704/226 |
| 2007/0016426 | A1 | 1/2007 | Hershey et al. | |
| 2007/0100605 | A1 * | 5/2007 | Renevey | G10L 21/0272 704/201 |
| 2008/0082328 | A1 | 4/2008 | Lee | |
| 2008/0162127 | A1 * | 7/2008 | Laaksonen | H04M 3/56 704/225 |
| 2008/0232607 | A1 | 9/2008 | Tashev et al. | |
| 2008/0247274 | A1 * | 10/2008 | Seltzer | G01S 3/8083 367/125 |
| 2009/0271190 | A1 * | 10/2009 | Niemisto | G10L 25/78 704/233 |
| 2011/0103615 | A1 | 5/2011 | Sun | |
| 2011/0274289 | A1 * | 11/2011 | Tashev | H04B 7/0854 381/92 |
| 2011/0274291 | A1 * | 11/2011 | Tashev | G01S 3/86 381/94.1 |

FOREIGN PATENT DOCUMENTS

| | | |
|---|---|---|
| CN | 101573954 A | 11/2009 |
| EP | 0 901 267 A2 | 3/1999 |
| JP | 2010-130411 | 10/2010 |
| RU | 2363994 C2 | 8/2009 |
| WO | WO 2012/072798 A1 | 6/2012 |

OTHER PUBLICATIONS

Written Opinion and Form PCT/ISA/210 (International Search Report) for PCT/EP2012/067124 mailed Jul. 2, 2013.
Oliver Thi Ergart et al: "Diffuseness estimation with high temporal resolution via spatial coherence between virtual first-order microphones". Applications of Signal Processing to Audio and Acoustics (WASPAA). 2011 IEEE Workshop on. IEEE. Oct. 16, 2011 (Oct. 16, 2011). pp. 217-220. XP032011478. DOI: 10.1109/ASPAA.2011.6082269 ISBN: 978-1-4577-0692-9.
Japanese Office Action—Notification of Reason for Rejection, Dispatch No. 288802, dated Jun. 28, 2016 re: Patent Application No. 2015-528886.
Office Action from Russian Patent Appl. No. 2015112126, dated Aug. 10, 2016.
Notification of the First Office Action from corresponding Chinese Patent Appl. No. 2012800768532, dated Jan. 12, 2017.

* cited by examiner

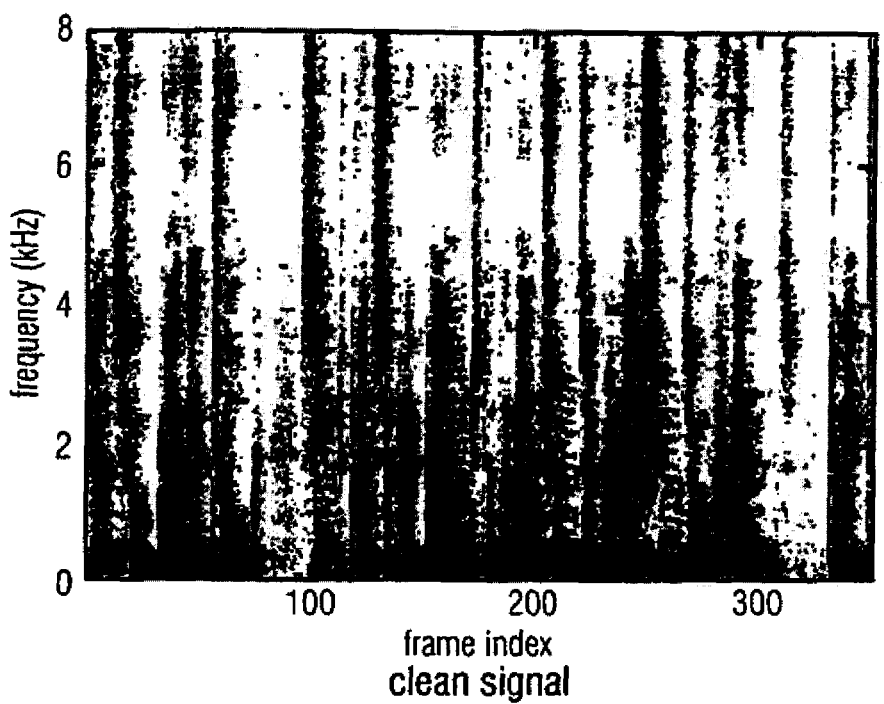
FIG 15A — frame index, clean signal
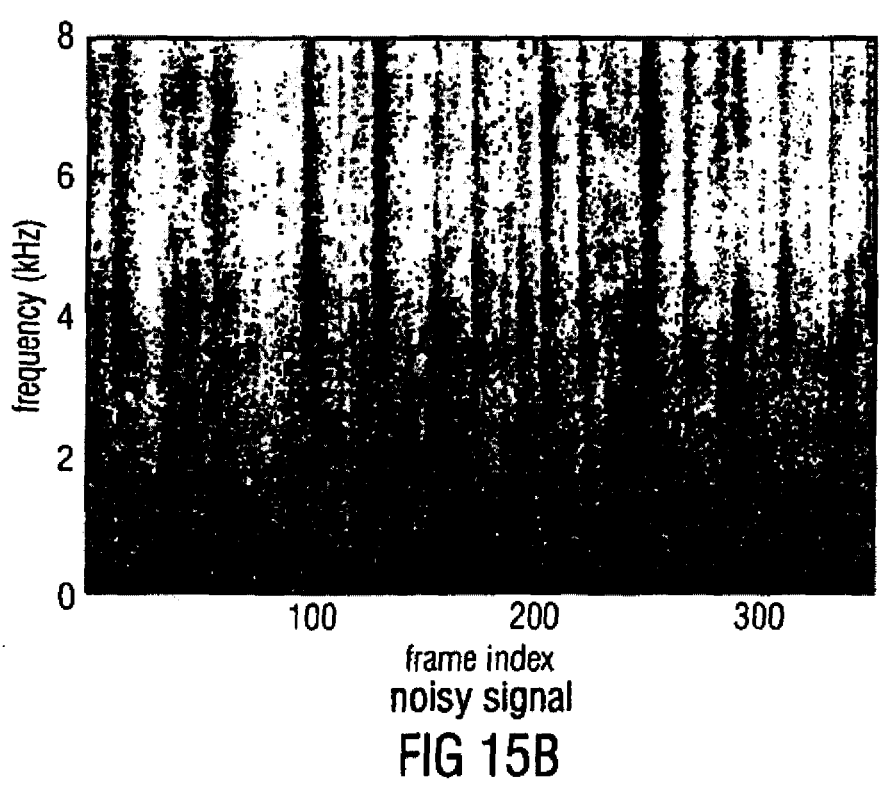
FIG 15B — frame index, noisy signal

PMWF, μ = 1

PMWF according to (17)

APPARATUS AND METHOD FOR PROVIDING AN INFORMED MULTICHANNEL SPEECH PRESENCE PROBABILITY ESTIMATION

CROSS-REFERENCE TO RELATED APPLICATIONS

This application is a continuation of copending International Application No. PCT/EP2012/067124, filed Sep. 3, 2012, which is incorporated herein by reference in its entirety.

BACKGROUND OF THE INVENTION

The present invention relates to audio signal processing and, in particular, to an apparatus and method for an informed multichannel speech presence probability estimation.

Audio signal processing becomes more and more important. In particular, hands-free capture of speech is necessitated in many human-machine interfaces and communication systems. Built-in acoustic sensors usually receive a mixture of desired sounds (e.g., speech) and undesired sounds (e.g., ambient noise, interfering talkers, reverberation, and sensor noise). As the undesired sounds degrade the quality and intelligibility of the desired sounds, the acoustic sensor signals may be processed (e.g., filtered and summed) in order to extract the desired source signal or, stated differently, to reduce the undesired sound signals. To compute such filters, an accurate estimate of the noise power spectral density (PSD) matrix is usually necessitated. In practice, the noise signal is unobservable and its PSD matrix needs to be estimated from the noisy acoustic sensor signals.

Single-channel speech presence probability (SPP) estimators have been used to estimate the noise PSD (see, e.g. [1-5]) and to control the tradeoff between noise reduction and speech distortion (see, e.g. [6, 7]). Multichannel a posteriori SPP has recently been employed to estimate the noise PSD matrix (see, e.g. [8]). In addition, the SPP estimate may be used to mitigate the power consumption of a device.

In the following, the well-established signal model in multichannel speech processing will be considered, where each acoustic sensor of an M-element array captures an additive mixture of a desired signal and undesired signal. The signal received at the m-th acoustic sensor can be described in the time-frequency domain as follows $$Y_m(k,n)=X_m(k,n)+V_m(k,n), \quad (1)$$

where $X_m(k, n)$ and $V_m(k, n)$ denote the complex spectral coefficients of the desired source signal the noise component m-th acoustic sensor, respectively, and n and k are the time and frequency indices, respectively.

The desired signal may, e.g., be spatially coherent across the microphones and the spatial coherence of the noise may, e.g., follow the spatial coherence of an ideal spherically isotropic sound field, see [24].

In other words, e.g., $X_m(k, n)$ may denote the complex spectral coefficients of the desired source signal at the m-th acoustic sensor, $V_m(k, n)$ may denote the complex spectral coefficients of the noise component at the m-th acoustic sensor, n may denote the time index and k may denote the frequency index.

The observed noisy acoustic sensor signals can be written in vector notation as $$y(k,n)=[Y_1(k,n) \ldots Y_M(k,n)]^T \quad (2)$$

and the power spectral density (PSD) matrix of y(k, n) is defined as $$\Phi_{yy}(k,n)=E\{y(k,n)y^H(k,n)\}, \quad (3)$$

where the superscript H denotes the conjugate transpose of a matrix. The vectors x(k, n) and v(k, n) and the matrices $\Phi_{xx}(k, n)$ and $\Phi_{vv}(k, n)$ are defined similarly. The desired and the undesired signals are assumed uncorrelated and zero mean, such that formula (3) can be written as $$\Phi_{yy}(k,n)=\Phi_{xx}(k,n)\Phi_{vv}(k,n). \quad (4)$$

The following standard hypotheses is introduced regarding the presence of a desired signal (e.g., a speech signal) in a given time-frequency bin:

$H_0(k, n): y(k; n)=v(k; n)$ indicating speech absence, and
$H_1(k, n): y(k; n)=x(k; n)+v(k; n)$ indicating speech presence.

It may, e.g., be appreciated to estimate the conditional a posteriori SPP, i.e., $p[H_1(k, n)|y(k, n)]$.

Assuming that one takes the i-th microphone of the array as a reference, it may, e.g., be appreciated to estimate the desired signal $X_i(n, k)$.

Under the assumption that the desired and undesired components can be modelled as complex multivariate Gaussian random variables, the multichannel SPP estimate is given by (see [9]):

$$p[H_1(k,n)|y(k,n)] = \left\{1 + \frac{q(k,n)}{1-q(k,n)}[1+\xi(k,n)]e^{-\frac{\beta(k,n)}{1+\xi(k,n)}}\right\}^{-1} \quad (5)$$

where $q(k, n)=p[H_1(k, n)]$ denotes the a priori speech presence probability (SPP), and $$\xi(k,n)=tr\{\Phi_{vv}^{-1}(k,n)\Phi_{xx}(k,n)\}, \quad (6)$$

$$\beta(k,n)=y^H(k,n)\Phi_{vv}^{-1}(k,n)\Phi_{xx}(k,n)\Phi_{vv}^{-1}(k,n)y(k,n), \quad (7)$$

where tr{•} denotes the trace operator. Alternative estimators assuming another type of distribution (e.g., a Laplacian distribution) may also be derived and used.

Only under the assumption that the desired signal PSD matrix is of rank one [e.g., $\Phi_{xx}(k, n)=\phi_{x_ix_i}(k,n)\gamma(k, n)\gamma_i^H(k,n)$ with $\phi_{x_ix_i}(k, n)=E\{|X_i(k, n)|^2\}$ and $\gamma_i$ denotes a column vector of length M], the multichannel SPP can be obtained by applying a single-channel SPP estimator to the output of a minimum variance distortionless response (MVDR) beamformer.

State-of-the-art approaches either use a fixed a priori SPP [4, 9] or a value that depends on the single-channel or multichannel a priori signal-to-noise ratio (SNR) (see [2, 8, 10]). Cohen et al. [10], use three parameters $\mathcal{P}_{local}(k, n)$, $\mathcal{P}_{global}(k, n)$, and $\mathcal{P}_{frame}(n)$ that are based on the time-frequency distribution of the estimated single-channel a priori SNR, to compute the a priori SPP given by $$q(k,n)=\mathcal{P}_{local}(k,n)\mathcal{P}_{global}(k,n)\mathcal{P}_{frame}(n). \quad (8)$$

These parameters exploit the strong correlation of speech presence in neighboring frequency bins of consecutive time frames. In other approaches of the state of the art (see [11]), the parameters are computed in the log energy domain. In further approaches of the state of the art (see [8]), the multichannel a priori SNR was used instead to compute $\mathcal{P}_{local}(k, n)$, $\mathcal{P}_{global}(k, n)$, and $\mathcal{P}_{frame}(n)$.

A major shortcoming of state-of-the-art SPP estimators is that they cannot distinguish between desired and undesired sounds.

SUMMARY

According to an embodiment, an apparatus for providing a speech probability estimation may have: a first speech probability estimator for estimating speech probability information indicating a first probability on whether a sound field of a scene includes speech or on whether the sound field of the scene does not include speech, and an output interface for outputting the speech probability estimation depending on the speech probability information, wherein the first speech probability estimator is configured to estimate the first speech probability information based on at least spatial information about the sound field or spatial information on the scene.

According to another embodiment, an apparatus for determining a noise power spectral density estimation may have: an inventive apparatus for providing a speech probability estimation, and a noise power spectral density estimation unit, wherein the inventive apparatus for providing a speech probability estimation is configured to provide the speech probability estimation to the noise power spectral density estimation unit, and wherein the noise power spectral density estimation unit is configured to determine the noise power spectral density estimation based on the speech probability estimation and a plurality of input audio channels.

According to another embodiment, an apparatus for estimating a steering vector may have: an inventive apparatus for providing a speech probability estimation, and a steering vector estimation unit, wherein the inventive apparatus for providing a speech probability estimation is configured to provide the speech probability estimation to the steering vector estimation unit, and wherein the steering vector estimation unit is configured to estimate the steering vector based on the speech probability estimation and a plurality of input audio channels.

According to another embodiment, an apparatus for multichannel noise reduction may have: an inventive apparatus for providing a speech probability estimation, and a filter unit, wherein the filter unit is configured to receive a plurality of audio input channels, wherein the inventive apparatus for providing a speech probability estimation is configured to provide the speech probability information to the filter unit, and wherein the filter unit is configured to filter the plurality of audio input channels to obtain filtered audio channels based on the speech probability information.

According to another embodiment, a method for providing a speech probability estimation may have the steps of: estimating speech probability information indicating a first probability on whether a sound field includes speech or on whether the sound field does not include speech, and outputting the speech probability estimation depending on the speech probability information, wherein estimating the first speech probability information is based on at least spatial information about the sound field or spatial information on the scene.

Another embodiment may have a computer program for implementing the inventive method when being executed on a computer or signal processor.

In the following we will use the term "scene". A scene is an environment where a sound field is generated. Spatial information on a scene may, for example, comprise information on the position of one or more sound sources which generate the sound field, information on the position of acoustic sensors, information on the distance of the sound sources to the acoustic sensors, information on whether a human speaker or mouth is detected, and/or information on whether a human speaker or mouth is in the proximity of the acoustic sensors.

A sound field may, for example, be characterized by the sound pressure at each position in an environment, e.g., an environment where the sound field exists. For example, a sound field may be characterized by the amplitudes of the sound pressure at each position in an environment, e.g., an environment where the sound field exists. Or, a sound field may, for example, be characterized by the complex sound pressure at each position in an environment, e.g., an environment where the sound field exists, when a spectral domain or a time-frequency domain is considered. For example, the sound pressures at positions in the environment characterizing the sound field may, for example, be recorded by one or more acoustic sensors, e.g. by one or more microphones. Spatial information about the sound field may, for example, comprise a direction of arrival vector or, e.g., a direct-to-diffuse energy ratio determined by the recordings of the one or more acoustic sensors recording the sound pressures at positions in the environment, the sound pressures characterizing the sound field.

An apparatus for providing a speech probability estimation is provided. The apparatus comprises a first speech probability estimator (which may be equal to the a priori speech presence probability estimator) for estimating speech probability information indicating a first probability on whether a sound field of a scene comprises speech or on whether the sound field of a scene does not comprise speech. Moreover, the apparatus comprises an output interface for outputting the speech probability estimation depending on the speech probability information. The first speech probability estimator is configured to estimate the first speech probability information based on at least spatial information about the sound field or spatial information on the scene.

Concepts to overcome the shortcoming of conventional technology by exploiting prior-information derived from acoustic sensor signals and possibly non-acoustic sensor signals in the computation of a conditional a posteriori SPP are provided. In particular, spatial information about the sound field such as directionality, proximity and location are utilized.

Parameters $\mathcal{P}_a$, $\mathcal{P}_b$ and/or $\mathcal{P}_c$, $\mathcal{P}_{local}(k, n)$, $\mathcal{P}_{global}(k, n)$, and/or $\mathcal{P}_{frame}(n)$ may be determined.

It is important to note that any combination (e.g., product, sum, weighted sum) of the parameters $\mathcal{P}_a$, $\mathcal{P}_b$, and/or $\mathcal{P}_c$ and other known parameters, e.g. $\mathcal{P}_{local}(k, n)$, $\mathcal{P}_{global}(k, n)$, and/or $\mathcal{P}_{frame}(n)$, can be used for obtaining the speech probability information by using the combiner. This also means that it is also possible to only use the parameters, $\mathcal{P}_a$, $\mathcal{P}_b$ or $\mathcal{P}_c$ for obtaining the speech probability information.

The meaning of the parameters will be explained further below.

Any possible combination of the parameters can be used, for example:

a) $q=\mathcal{P}_c$ (E.g., assume $\mathcal{P}_c=0.7$ when an object is in the proximity of the sensor. Then any active sound source (whether or not close) would be considered desired with an a priori SPP of 1−0.7=0.3.)

b) $q=\mathcal{P}_a\mathcal{P}_c$ (E.g., a sound is considered desired when there is an object close to the sensor and the DDR is sufficiently high)

c) $q=\mathcal{P}_b\mathcal{P}_c$ (E.g., a sound is considered desired when there is an object close to the sensor and the location of the sound source is within the area of interest, e.g., direction-of-arrival range)

d) $q = \mathcal{P}_a \mathcal{P}_b \mathcal{P}_c$ (E.g., a sound is considered desired when there is an object close to the sensor, the DDR of the observed sound is sufficiently high and the location of the sound source is within the area of interest).

According to an embodiment, the apparatus may furthermore comprise a second speech probability estimator for estimating the speech probability indicating a second probability on whether the sound field comprises speech or on whether the sound field does not comprise speech. The second speech probability estimator may be configured to estimate the speech probability based on the speech probability information estimated by the first speech probability estimator, and based on one or more acoustic sensor signals, which depend on the sound field.

In another embodiment, the first speech probability estimator may be configured to estimate the speech probability information based on directionality information, wherein the directionality information indicates, how directional sound of the sound field is. Alternatively or additionally, the first speech probability estimator may be configured to estimate the speech probability information based on location information, wherein the location information indicates at least one location of a sound source of the scene. Alternatively or additionally, the first speech probability estimator is configured to estimate the speech probability information based on proximity information, wherein the proximity information indicates at least one proximity of at least one (possible) sound object to at least one proximity sensor.

According to a further embodiment, the first speech probability estimator may be configured to estimate the speech probability by determining a direct-to-diffuse ratio estimation of a direct-to-diffuse ratio as the spatial information, the direct-to-diffuse ratio indicating a ratio of direct sound comprised by the acoustic sensor signals to diffuse sound comprised by the acoustic sensor signals.

In another embodiment, the first speech probability estimator may be configured to determine the direct-to-diffuse ratio estimation by determining a coherence estimation of a complex coherence between a first acoustic signal of the acoustic sensor signals, the first acoustic signal being recorded by a first acoustic sensor p, and a second acoustic signal of the acoustic sensor signals, the second acoustic signal being recorded by a second acoustic sensor q. The first speech probability estimator may moreover be configured to determine the direct-to-diffuse ratio based on a phase shift estimation of a phase shift of the direct sound between the first acoustic signal and the second acoustic signal.

According to an embodiment, the first speech probability estimator may be configured to determine the direct-to-diffuse ratio estimation $\hat{\Gamma}(k, n)$ between the first acoustic signal and the second acoustic signal by applying the formula:

$$\hat{\Gamma}(k, n) = \Re\left\{ \frac{\Gamma_{pq,diff}(k) - \hat{\Gamma}_{pq}(k, n)}{\hat{\Gamma}_{pq}(k, n) - e^{j\hat{\theta}(k,n)}} \right\}$$

$\hat{\Gamma}_{pq}(k, n)$ may be the coherence estimation of the complex coherence between the first acoustic signal and the second acoustic signal with respect to a time-frequency bin (k, n), wherein n denotes time and wherein k denotes frequency.

$\theta(k, n)$ may be the phase shift estimation of the phase shift of the direct sound between the first acoustic signal and the second acoustic signal with respect to the time-frequency bin (k, n), and $\Gamma_{pq,diff}(k)$ may correspond to the spatial coherence between the acoustic sensor p and the acoustic sensor q in a pure diffuse sound field.

The function $\Gamma_{pq,diff}(k)$ may be measured or may be pre-computed depending on the assumed diffuse sound field.

In another embodiment, the first speech probability estimator may be configured to estimate the speech probability information by determining $f[\hat{\Gamma}(k, n)]$, wherein $\hat{\Gamma}(k, n)$ may be the direct-to-diffuse ratio estimation, and wherein $f[\hat{\Gamma}(k, n)]$ may be a mapping function representing a mapping of the direct-to-diffuse ratio estimation to a value between 0 and 1.

In another embodiment, the mapping function $f[\hat{\Gamma}(k, n)]$ may be defined by the formula:

$$f[\hat{\Gamma}(k, n)] = l_{max} - (l_{max} - l_{min}) \frac{10^{c\rho/10}}{10^{c\rho/10} + \hat{\Gamma}(k, n)^\rho}$$

wherein $l_{min}$ may be a minimum value of the mapping function, wherein $l_{max}$ may be a maximum value of the mapping function, wherein c may be a value for controlling the offset along the $\Gamma$ axis, and wherein $\rho$ may define the steepness of transition between $l_{min}$ and $l_{max}$.

According to a further embodiment, the first speech probability estimator may be configured to determine the location parameter $\mathcal{P}_b$ by employing the formula $$\mathcal{P}_b = \int_{\Omega \in S} \frac{p(\hat{\Omega} | \Omega; \sum_\Omega) p(\Omega)}{p(\hat{\Omega})} \mathcal{R}(\Omega) \, d\Omega,$$

wherein $\Omega$ is a specific location, wherein $\hat{\Omega}$ is an estimated location, wherein $\mathcal{P}(\hat{\Omega}|\Omega; \Sigma_\Omega)$ is a conditional probability density function, and wherein $\mathcal{P}(\Omega)$ is the prior probability density function of $\Omega$, and wherein $\mathcal{P}(\hat{\Omega})$ is the probability density function of $\hat{\Omega}$, and wherein $\Sigma_\Omega$ denotes the uncertainty associated with of the estimates of $\Omega$, and wherein $\mathcal{R}(\Omega)$ is a multidimensional function that describes an area of interest, wherein $0 \leq \mathcal{R}(\Omega) \leq 1$.

In another embodiment, the first speech probability estimator may be configured to determine the speech probability information q(k, n) by applying the formula:

$$q(k, n) = f[\Gamma(k, n)] \cdot \int_{-\pi}^{\pi} \frac{p(\theta | \hat{\theta}; \sigma) p(\theta)}{p(\hat{\theta})} \mathcal{R}(\theta) d\theta$$

wherein $\theta$ is a specific direction of arrival, and wherein $\hat{\theta}$ is an estimated direction of arrival, wherein $\mathcal{P}(\theta|\hat{\theta}; \sigma)$ is a conditional probability density function, and wherein $\mathcal{P}(\theta)$ is the prior probability density function of $\theta$, and wherein $\mathcal{P}(\hat{\theta})$ is the probability density function of $\hat{\theta}$, and wherein $\sigma$ denotes the uncertainty associated with of the estimates of $\theta$, and wherein $f[\hat{\Gamma}(k, n)]$ represents a mapping of the direct-to-diffuse ratio estimation $\hat{\Gamma}(k, n)$ to a value between 0 and 1, and wherein $\mathcal{R}(\theta)$ is a multidimensional function that describes an area of interest, wherein $0 \leq \mathcal{R}(\theta) \leq 1$.

In a further embodiment, the first speech probability estimator may be configured to determine a proximity parameter as the spatial information, wherein the proximity parameter has a first parameter value, when the first speech probability estimator detects one or more possible sound sources within a predefined distance from a proximity sensor, and wherein the proximity parameter has a second parameter value, being smaller than the first parameter value, when the first speech probability estimator does not detect possible sound sources in the direct proximity of the proximity sensor. The first speech probability estimator is configured to determine a first speech probability value as the speech probability information when the proximity parameter has the first parameter value, and wherein the first speech probability estimator is configured to determine a second speech probability value as the speech probability information when the proximity parameter has the second parameter value, the first speech probability value indicating a first probability that the sound field comprises speech, wherein the first probability is greater than a second probability that the sound field comprises speech, the second probability being indicated by the second speech probability value.

In an embodiment, an apparatus for determining a noise power spectral density estimation is provided, comprising an apparatus according to one of the above-described embodiments and a noise power spectral density estimation unit. The apparatus according to one of the above-described embodiments may be configured to provide the speech probability estimation to the noise power spectral density estimation unit. The noise power spectral density estimation unit is configured to determine the noise power spectral density estimation based on the speech probability estimation and a plurality of input audio channels.

In a further embodiment, an apparatus for estimating a steering vector is provided, comprising an apparatus according to one of the above-described embodiments and a steering vector estimation unit. The apparatus according to one of the above-described embodiments may be configured to provide the speech probability estimation to the steering vector estimation unit. The steering vector estimation unit may be configured to estimate the steering vector based on the speech probability estimation and a plurality of input audio channels.

According to another embodiment, an apparatus for multichannel noise reduction is provided, comprising an apparatus according to one of the above-described embodiments and a filter unit. The filter unit may be configured to receive a plurality of audio input channels. The apparatus according to one of the above-described embodiments may be configured to provide the speech probability information to the filter unit. The filter unit may be configured to filter the plurality of audio input channels to obtain filtered audio channels based on the speech probability information and a plurality of input audio channels.

In an embodiment, the first speech probability estimator may be configured to generate a tradeoff parameter, wherein the tradeoff parameter depends on at spatial information about the sound field or spatial information on the scene.

According to a further embodiment, the filter unit may be configured to filter the plurality of audio input channels depending on the tradeoff parameter.

Concepts are proposed to blindly extract sounds that are strongly coherent across the array. A multichannel noise PSD matrix estimator is provided that is based on the a posteriori SPP. In contrast to the state of the art, an estimate of the DDR is used to determine the a priori SPP. Moreover, it is proposed to use the estimated DDR to control the tradeoff parameter of the PMWF. Moreover, it is demonstrated that the proposed DDR-controlled PWMF outperforms the MVDR beamformer and the MWF in terms of segmental SNR improvement and PESQ improvement.

In an embodiment, a method for providing a speech probability estimation is provided. The method comprises:

Estimating speech probability information indicating a first probability on whether a sound field comprises speech or on whether the sound field does not comprise speech, and:

Outputting the speech probability estimation depending on the speech probability information.

Estimating the first speech probability information is based on at least spatial information about the sound field or spatial information on the scene.

Moreover, a computer program for implementing the above-described method when being executed on a computer or signal processor is provided.

BRIEF DESCRIPTION OF THE DRAWINGS

Embodiments of the present invention will be detailed subsequently referring to the appended drawings, in which:

FIGS. 15A-15D illustrate exemplar spectrograms for babble noise ($S_i=11$ dB)

DETAILED DESCRIPTION OF THE INVENTION

Figure 1:
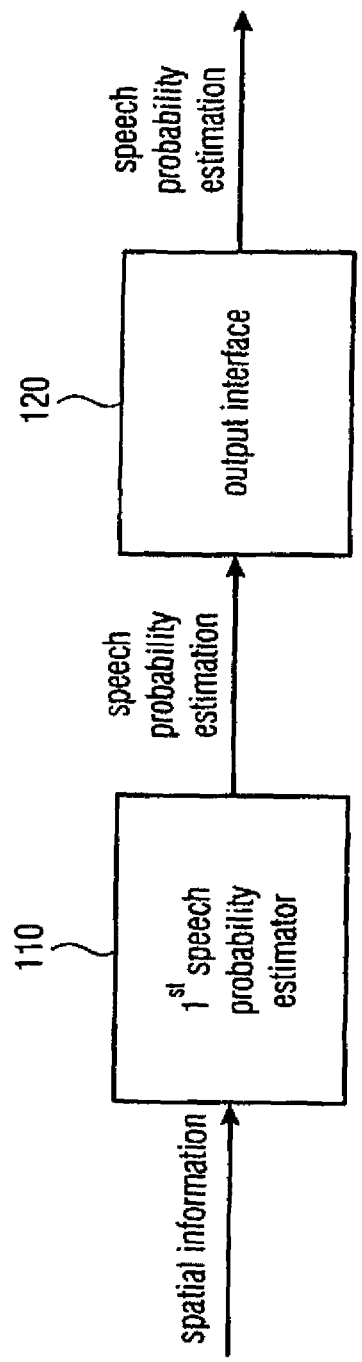
FIG. 1 illustrates an apparatus for providing a speech probability estimation according to an embodiment.

FIG. 1 illustrates an apparatus for providing a speech probability estimation according to an embodiment. The apparatus comprises a first speech probability estimator 110 for estimating speech probability information indicating a first probability on whether a sound field of a scene comprises speech or on whether the sound field of the scene does not comprise speech. Moreover, the apparatus comprises an output interface 120 for outputting the speech probability estimation depending on the speech probability information. The first speech probability estimator 110 is configured to estimate the first speech probability information based on at least spatial information about the sound field or spatial information on the scene.

A scene is an environment where a sound field is generated. Spatial information on a scene may, for example, comprise information on the position of one or more sound sources which generate the sound field, information on the position of acoustic sensors, information on the distance of the sound sources to the acoustic sensors, information on whether a human speaker or mouth is detected, and/or information on whether a human speaker or mouth is in the proximity of the acoustic sensors.

Spatial information on a sound field may, for example, be directionality information indicating how directional sound of the sound field is. For example, the directionality information may be a direct-to-diffuse ratio (DDR) as described below.

Figure 2:
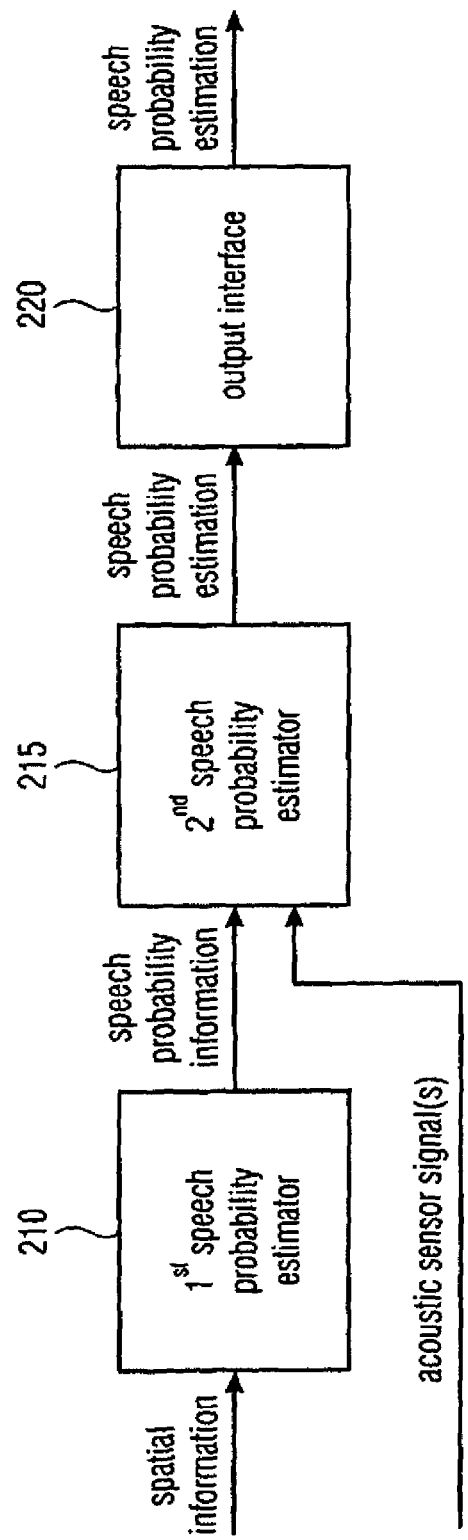
FIG. 2 illustrates an apparatus for providing a speech probability estimation according to another embodiment.

FIG. 2 illustrates an apparatus for providing a speech probability estimation according to another embodiment. The apparatus comprises a first speech probability estimator 210 and an output interface 220. Moreover, the apparatus furthermore comprises a second speech probability estimator 215 for estimating the speech probability estimation indicating a second probability on whether the sound field comprises speech or on whether the sound field does not comprise speech. The second speech probability estimator 215 is configured to estimate the speech probability estimation based on the speech probability information estimated by the first speech probability estimator, and based on one or more acoustic sensor signals, which depend on the sound field.

For this purpose, the first speech probability estimator receives spatial information about the sound field and/or spatial information on the scene. The first speech probability estimator 210 then estimates the speech probability information which indicates the first probability on whether the sound field of the scene comprises speech or on whether the sound field of the scene does not comprise speech. The first speech probability estimator 210 may then feed the speech probability information into the second speech probability estimator 215. Moreover, the second speech probability estimator 215 may furthermore receive one or more acoustic sensor signals. The second speech probability estimator 215 then estimates the speech probability estimation based on the speech probability information estimated by the first speech probability estimator 210, and based on one or more acoustic sensor signals, which depend on the sound field.

In contrast to the state of the art, inter alia, the estimation of a speech probability is conducted based on spatial information. This significantly improves the estimation of the speech probability.

Now, the following hypotheses regarding the presence of a desired speech signal in a given time-frequency bin is introduced, according to which:

$H_0(k, n):y(k, n)=v(k, n)$ indicates desired speech absence and
$H_1(k, n):y(k, n)=x(k, n)+v(k, n)$ indicates desired speech presence.

In other words: $H_0(k, n)$ indicates the absence of desired speech, while $H_1(k, n)$ indicates the presence of desired speech.

Figure 3:
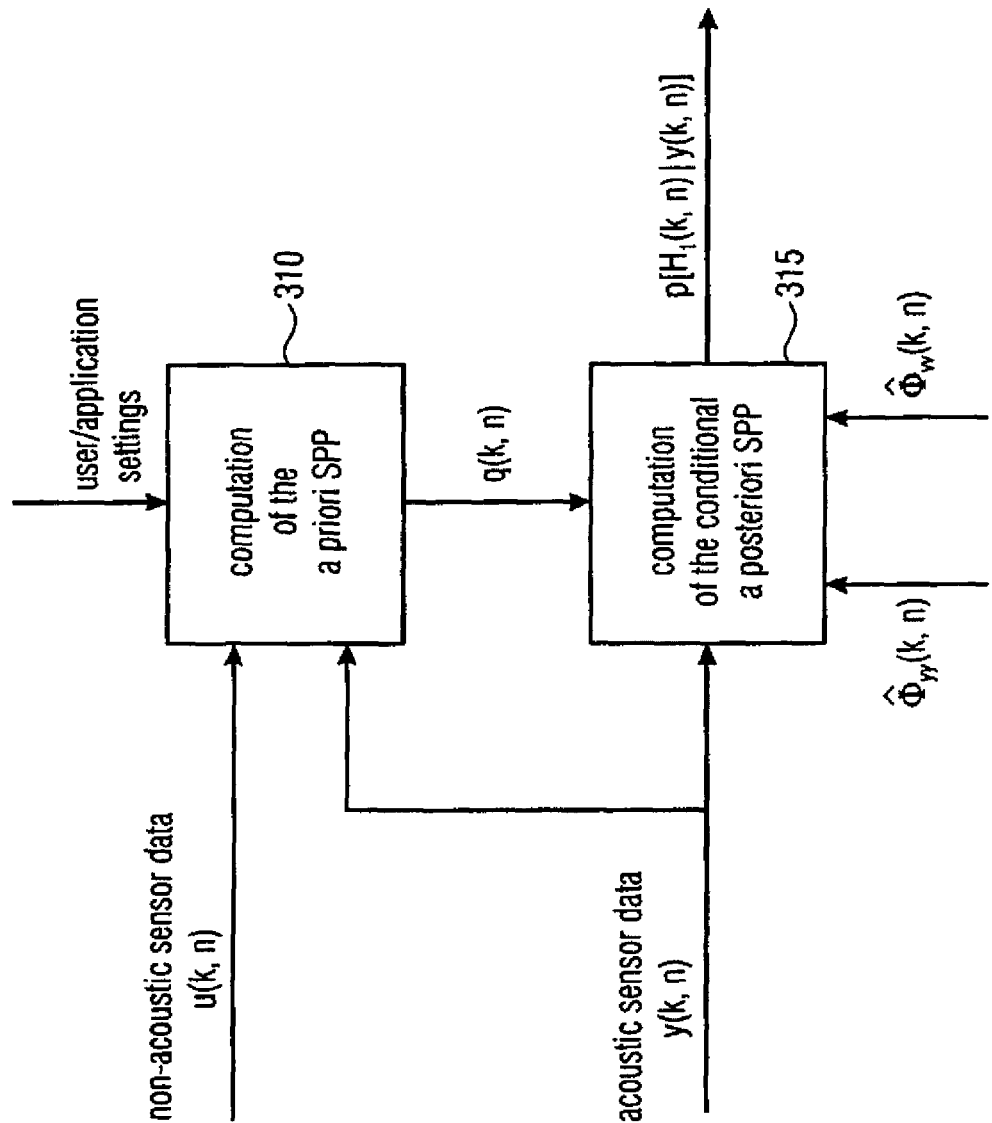
FIG. 3 illustrates a block diagram of an informed multichannel a posteriori SPP estimator according to an embodiment.

FIG. 3 illustrates a block diagram of an informed multichannel SPP estimator. The module "Computation of the Conditional a posteriori SPP" may implement formula (5).

In FIG. 3, module 310 realizes the implementation of a "Computation of the a priori SPP". In the embodiment of FIG. 3, the "Computation of the a priori SPP" module 310 may implement a particular realization of the first speech probability estimator 210 of FIG. 2. Moreover, in FIG. 3, module 315 realizes the implementation of the "Computation of the Conditional a posteriori SPP". In the embodiment of FIG. 3, the "Computation of the Conditional a posteriori SPP" module 315 may implement a particular realization of the second speech probability estimator 215 of FIG. 2.

Figure 4:
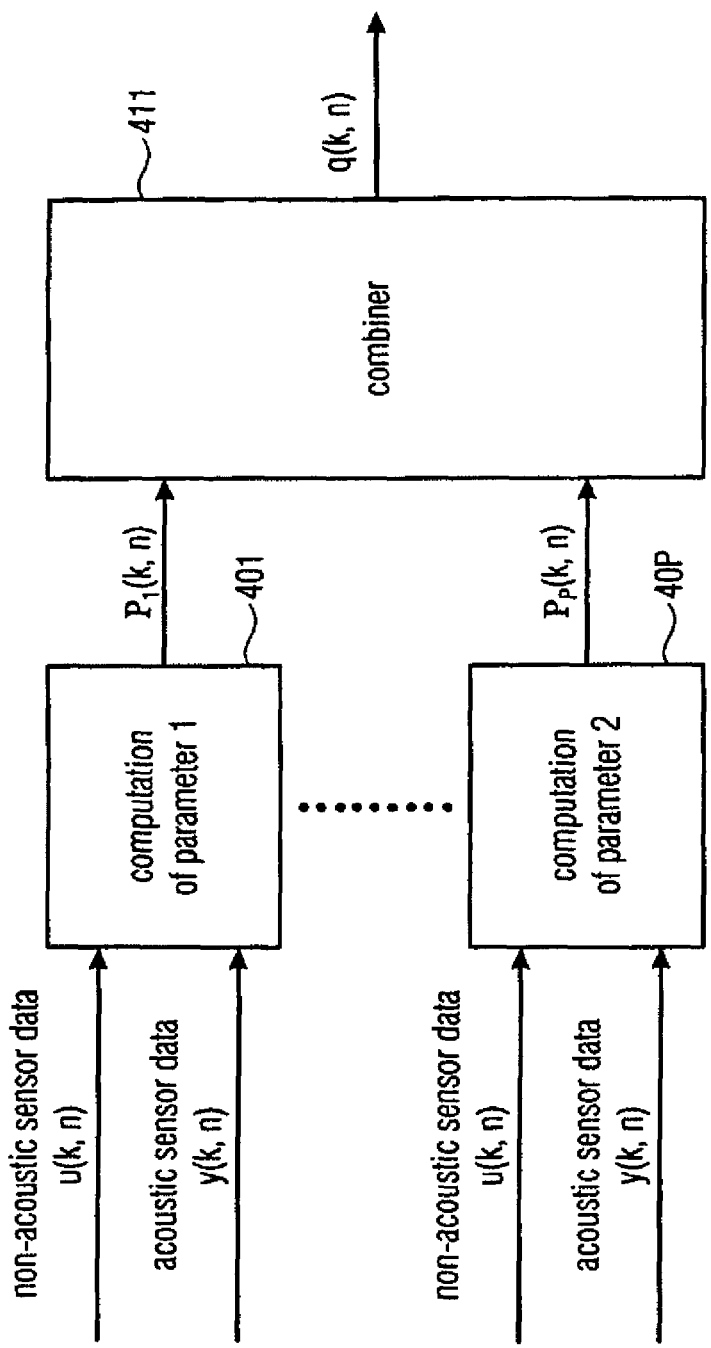
FIG. 4 illustrates a block diagram of an a priori SPP estimator according to an embodiment.

An implementation of the "Computation of the a priori SPP" module 310 according to a particular embodiment is shown in FIG. 4. In FIG. 4, user/application settings are available for the computation of the parameters in modules 401, . . . , 40P. User/application settings may also be provided to the combiner 411. Here P parameters are computed using acoustic and non-acoustic sensor data as well as user/application settings. The parameters $\mathcal{P}_1, \ldots, \mathcal{P}_p$ are combined (e.g., weighted sum, product, maximum ratio combiner) by the combiner 411 to compute the a priori SPP q(k, n).

In the following subsections, three parameters that can be used to compute the a priori SPP necessitated for the informed multichannel SPP are presented.

In the following, inter alia, a parameter $\mathcal{P}_a$ based on directionality is provided.

It is reasonable to assume that desired sounds are directional while undesired sounds are non-directional. A parameter is therefore used to indicate how directional the observed sound is. One possibility to measure the directionality of the sound field is the direct-to-diffuse ratio (DDR). An estimate of the DDR can be obtained via the complex coherence (CC) as shown in [12]. The CC between two signals measured at acoustic sensors p and q is defined in time-frequency domain as $$\Gamma_{pq}(k, n) = \frac{\phi_{pq}(k, n)}{\sqrt{\phi_{pp}(k, n)\phi_{qq}(k, n)}}, \quad (9)$$

where $\phi_{pq}(k, n)$ is cross PSD and $\phi_{pp}(k, n)$ and $\phi_{qq}(k, n)$ are the auto PSDs of the two signals. The DDR estimator in [12] is based on a sound field model where the sound pressure at any position and time-frequency bin is modelled as a superposition of a direct sound represented by a single monochromatic plane wave and an ideal diffuse field. Assuming omnidirectional acoustic sensors, the CC function can be expressed as $$\Gamma_{pq}(k) = \frac{\Gamma(k, n)e^{j\theta(k,n)} + \Gamma_{pq,diff}(k)}{\Gamma(k, n) + 1}, \quad (10)$$

where $\theta(k, n)$ is the phase shift of the direct sound between the two acoustic sensors, $\Gamma(k, n)$ denotes the DDR, $\Gamma_{pq,\text{diff}}(k)=\sin(\kappa d)/\kappa d$ is the CC of an ideal spherically isotropic sound field, with $\kappa$ corresponding to the wavenumber at frequency index k, and d to the distance between acoustic sensors p and q. The function $\Gamma_{pq,\text{diff}}(k)$ can also result from a measurement. The PSDs necessitated to compute $\Gamma_{pq}(k)$ using (9), are approximated by temporal averages and the phase shift θ(k, n) of the direct sound can be obtained from the estimated noisy PSD, i.e., $\hat{\theta}(k, n)=\angle\hat{\phi}_{pq}(k, n)$.

The DDR Γ(k, n) can now be expressed in terms of the estimated CC $\hat{\Gamma}_{pq}(k, n)$ and the estimated phase shift $\hat{\theta}(k, n)$ as, $$\hat{\Gamma}(k, n) = \Re\left\{\frac{\Gamma_{pq,\text{diff}}(k) - \hat{\Gamma}_{pq}(k, n)}{\hat{\Gamma}_{pq}(k, n) - e^{j\hat{\theta}(k,n)}}\right\}. \quad (11)$$

Depending on the application or acoustic scenario (indoors or outdoors), the CC function $\Gamma_{pq,\text{diff}}(k)$ can also be replaced by the spatial coherence corresponding to another noise field. When more than two acoustic sensors are available, the DDR estimate obtained by distinct acoustic sensor pairs can be combined.

Clearly, low values of $\hat{\Gamma}(k, n)$ indicate the absence of a directional source, whereas high values of $\hat{\Gamma}(k, n)$ indicate the presence of a directional source. Based on this observation, $\hat{\Gamma}(k, n)$ can be used to compute a parameter, denoted by Pa, that is used to obtain the a priori SPP. An example mapping function is given by $$f[\Gamma(k, n)] = l_{max} - (l_{max} - l_{min})\frac{10^{c\rho/10}}{10^{c\rho/10} + \Gamma(k, n)^\rho}, \quad (12)$$

where $l_{min}$ and $l_{max}$ determine the minimum and maximum values that the function can attain, c (in dB) controls the offset along the Γ axis, and ρ defines the steepness of transition between $l_{min}$ and $l_{max}$.

Figure 5:
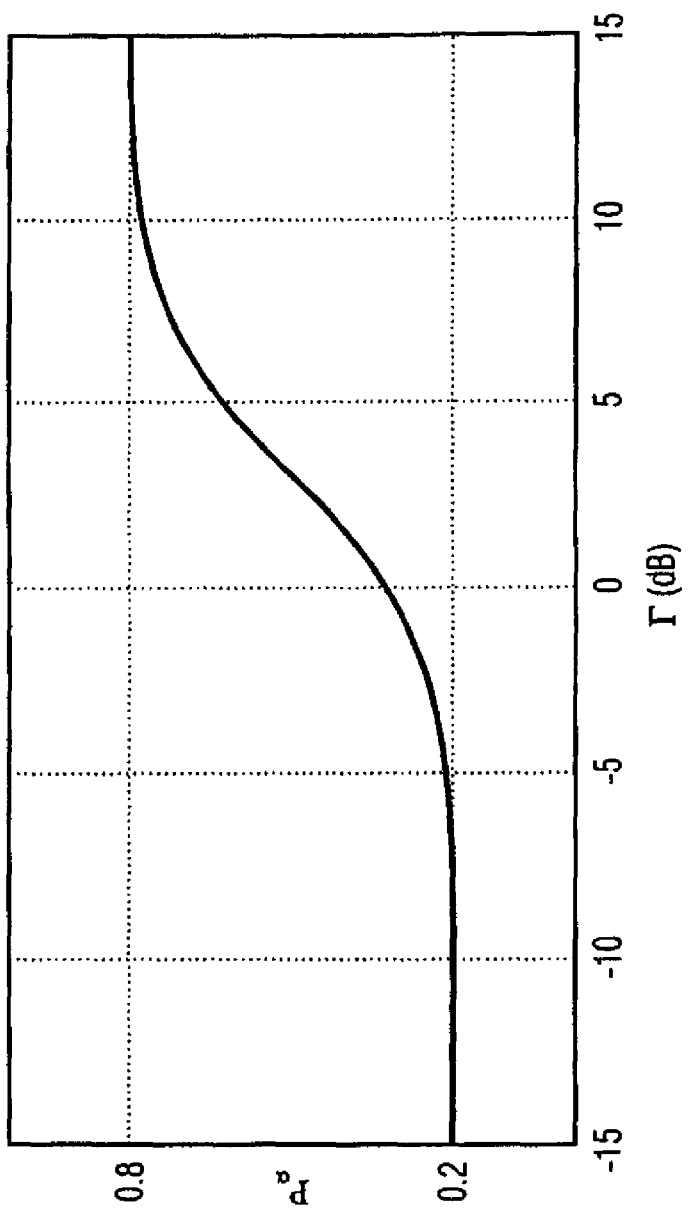
FIG. 5 illustrates a mapping from DDR $\Gamma$ to the parameter $\mathcal{P}_a$: $l_{min}=0.2$, $l_{max}=0.8$, $\rho=2$, $c=3$ according to an embodiment.

FIG. 5 illustrates a mapping (12) from DDR Γ to the parameter Pa: $l_{min}=0.2$, $l_{max}=0.8$, ρ=2, c=3.

Finally, the parameter is given by $$\mathcal{P}_a(k,n)=f[\hat{\Gamma}(k,n)]. \quad (13)$$

The a priori SPP can, for example, be obtained by $$q(k,n)=\mathcal{P}_a(k,n)=f[\hat{\Gamma}(k,n)] \quad (14)$$

or $$q(k,n)=\mathcal{P}_a(k,n)\mathcal{P}_{local}(k,n)\mathcal{P}_{global}(k,n)\mathcal{P}_{frame}(n). \quad (15)$$

The parameters of the mapping function are chosen such that a low DDR corresponds to a low SPP, while a high DDR corresponds to a high SPP.

In the following, inter alia, a parameter $\mathcal{P}_b$ based on location and uncertainty is provided.

According to embodiments, a parameter obtained by the instantaneous location estimate and the associated uncertainty is computed. The term "location" refers to one-dimension locations (DOA only) as well as to two and three dimensional locations. The location can be described in Cartesian coordinates (i.e., x, y, and z position) or spherical coordinates (i.e., azimuth angle, elevation angle, and distance).

Under specific conditions, e.g., DDR, SNR, DOA, array geometry and used estimators for the location parameter and DDR, an empirical probability density function (PDF) can be found that describes the probability distribution of the estimated location for a source at a specific location. A training phase is used to compute this empirical PDF. An analytic PDF (for example, a Gaussian PDF in the one-dimensional case and a multivariate Gaussian PDF in the two and three dimensional case) is then fitted to the estimated location parameters for each source location and specific condition.

In this example, the PDF is denoted by $p(\hat{\Omega}|\Omega; \Sigma)$, where the matrix Σ describes the uncertainty associated with the estimate of Ω. From the data a multi-dimensional mapping function $f_\Sigma$ is derived that maps the aforementioned conditions to the uncertainty Σ. Additionally, the marginal probabilities $p(\Omega)$ and $p(\hat{\Omega})$ can be also computed in the training phase. For instance, $p(\Omega)$ can be modelled based on a priori information about possible source locations, whereas $p(\hat{\Omega})$ can be computed by observing the estimates during the training phase.

In addition, an area of interest is defined by the function $\mathcal{R}(\Omega)$. In case the distance is used as a location parameter, a minimum and maximum distance that determine the location of the desired source can be defined. Alternatively, the desired distance range can be extracted automatically from a depth sensor or time of flight sensor. In this case, the desired range can be chosen based on the mean and variance of the depth profile as well as a pre-defined deviation and user/application defined limits.

The computation of the proposed parameter is as follows:
1. Estimate the conditions (e.g., instantaneous location parameter $\hat{\Omega}$, instantaneous directionality $\mathcal{D}(k, n)$, and SNR) using the observed acoustic signals y(k, n).
2. The area of interest of the desired source is determined: i) by the user/application, see FIG. 6, or ii) by analyzing acoustic and non-acoustic sensor data, see FIG. 7. In the latter case the area of interest, denoted by $\mathcal{R}(\Omega, n)$, is time-variant. An image can, for example, be analyzed to determine the location of the mouth of the speaker(s). Face and object detection as well as speaker identification can be used to define desired and undesired sound sources. The application allows to select desired sound sources/objects and undesired sound sources/objects online by means of a user interface. The prior $p(\Omega)$ can be determined by the user/application or by analyzing non-acoustic sensors.
3. Determine the uncertainty indicator $\Sigma_\Omega$ for every point of the region of interest, based on the conditions computed in Step 1 and the multi-dimensional mapping function $f_\Sigma$.
4. The parameter is computed by $$\mathcal{P}_b = \int_{\Omega \in S} p(\Omega | \hat{\Omega}; \Sigma_\Omega)\mathcal{R}(\Omega)d\Omega \quad (16)$$

$$= \int_{\Omega \in S} \frac{p(\hat{\Omega}|\Omega; \Sigma_\Omega)p(\Omega)}{p(\hat{\Omega})}\mathcal{R}(\Omega)d\Omega, \quad (17)$$

where S defines all possible locations that are considered, and $\mathcal{R}(\Omega)$ is a multidimensional function ($0 \leq \mathcal{R}(\Omega) \leq 1$) that describes the area of interest. Equation (17) follows from (16) directly according to the Bayes rule, and enables the computation of $\mathcal{P}_b$ using the PDFs estimated in the training phase.

In the one-dimensional case, $\hat{\theta}(k, n)$ denotes the estimated instantaneous DOA and σ(k, n) is proportional to the associated uncertainty. For example, if a linear acoustic sensor array is used, the accuracy of the estimated DOA at the broadside of the array is larger than the accuracy of the estimated DOA at the endfire of the array. Consequently, the uncertainty is larger and hence σ is larger for the endfire direction compared to the broadside direction. It is also known that the performance of the DOA estimator depends on the SNR; low SNR levels yield a larger estimation variance and hence larger uncertainty compared to high SNR levels. In the one-dimensional case, the area of interest can, for example, be defined as $$\mathcal{R}(\theta) = \begin{cases} 1 & \text{for } \theta_{min} \leq \theta \leq \theta_{max}; \\ 0 & \text{otherwise} \end{cases} \quad (18)$$

such that any source that is active between $\theta_{min}$ and $\theta_{max}$ is assumed to be desired.

The a priori SPP can, for example, be obtained by combining parameters $\mathcal{P}_a(k, m)$ and $\mathcal{P}_b(k, n)$:

$$q(k, n) = \mathcal{P}_a(k, n) \cdot \mathcal{P}_b(k, n) \quad (19)$$

$$= f[\Gamma(k, n)] \cdot \int_{-\pi}^{\pi} \frac{p(\theta | \hat{\theta}; \sigma) p(\theta)}{p(\hat{\theta})} \mathcal{R}(\theta) d\theta,$$

where $f(\Gamma)$ is given by (12).

Figure 6:
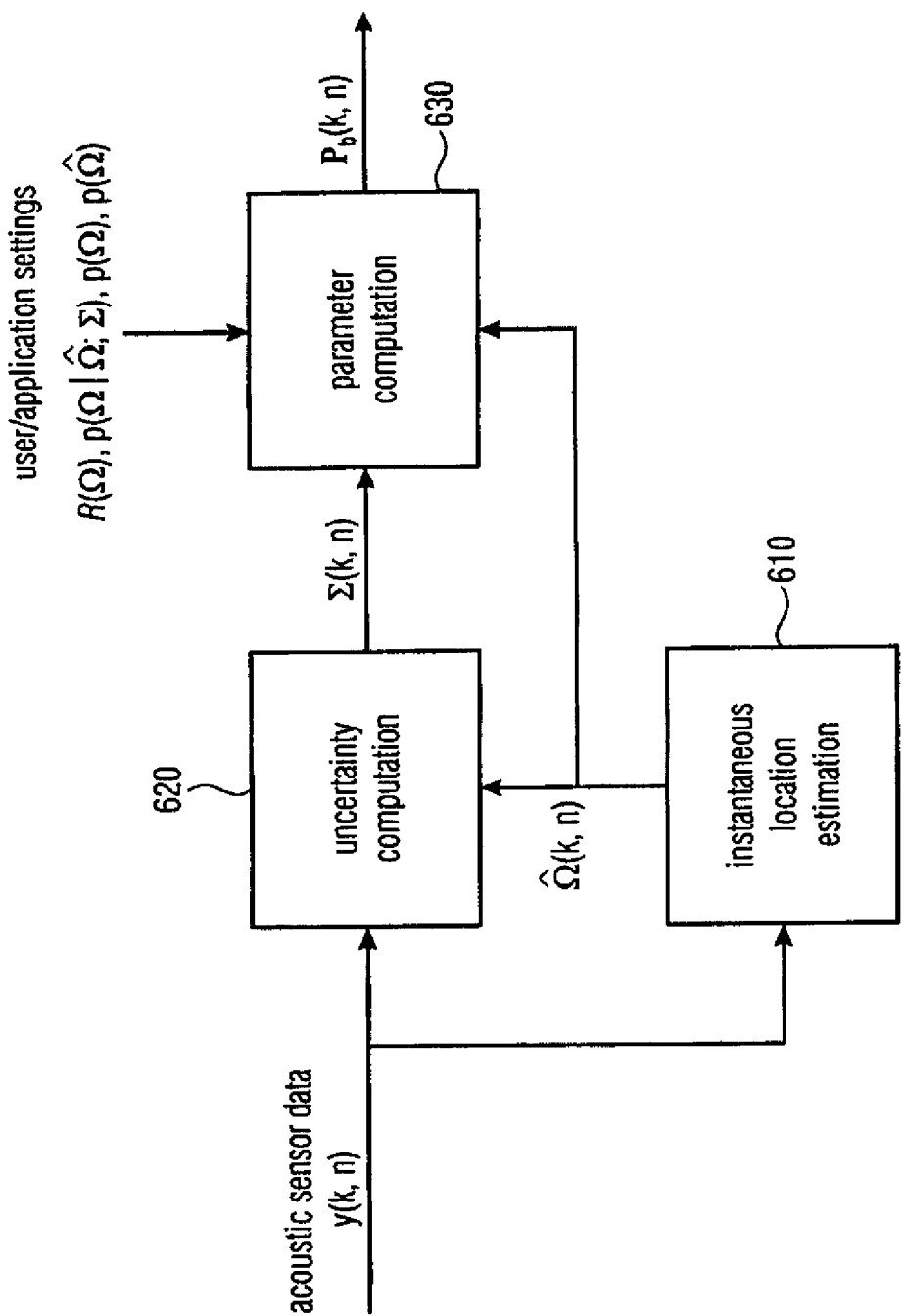
FIG. 6 illustrates a block diagram of the estimator for $\mathcal{P}_b$ using user/application settings to determine the area of interest according to an embodiment.

FIG. 6 illustrates a block diagram of the estimator for $\mathcal{P}_b$ using user/application settings to determine the area of interest. An Instantaneous Location Estimation module 610 is configured to estimate the instantaneous location. An uncertainty computation module 620 is configured to conduct the uncertainty computation. Moreover, a Parameter Computation module 630 is configured to conduct the parameter computation.

Figure 7:
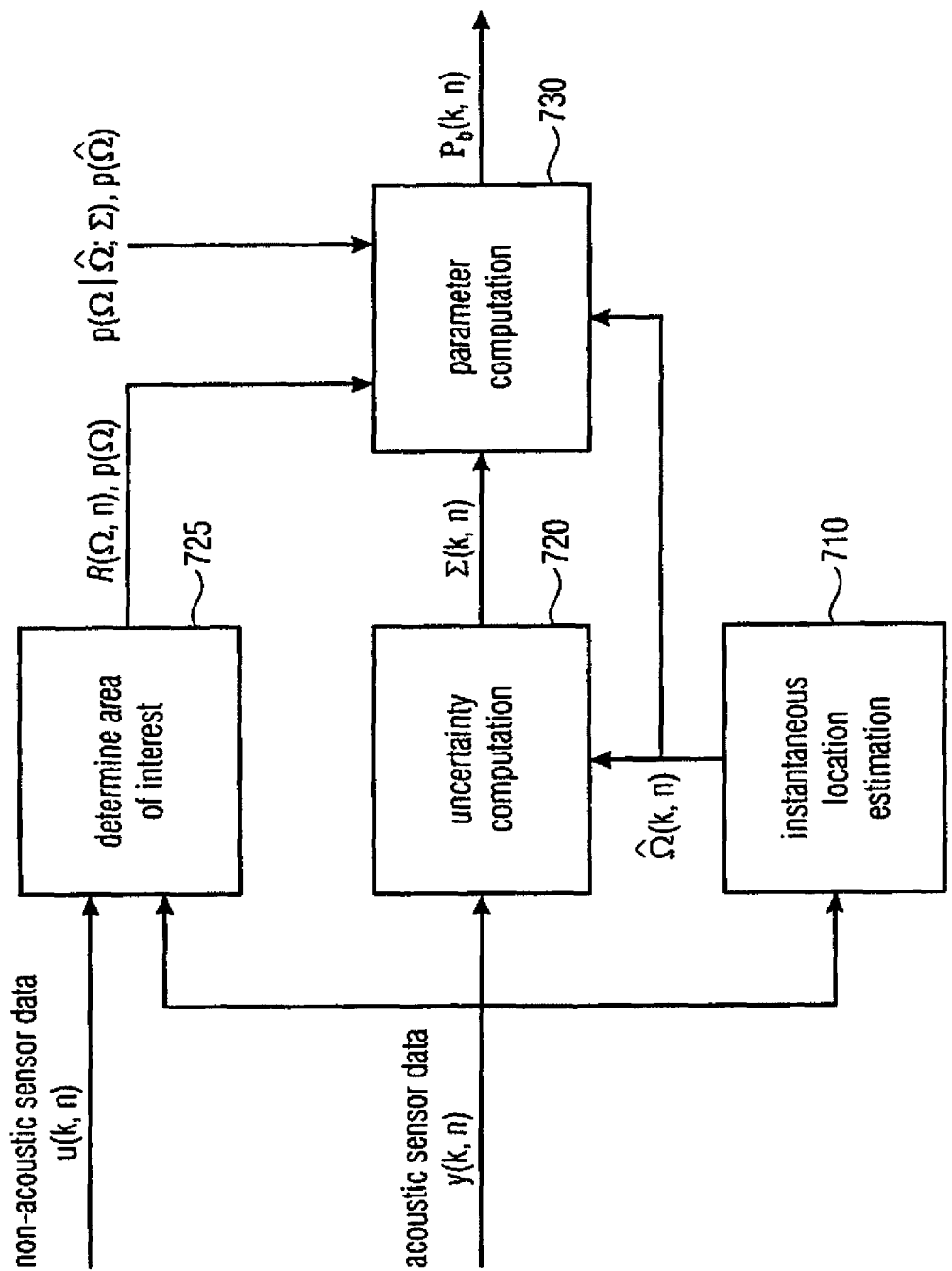
FIG. 7 illustrates a block diagram of the estimator for $\mathcal{P}_b$ using acoustic and non-acoustic data to determine the area of interest according to an embodiment.

FIG. 7 illustrates a block diagram of the estimator for $\mathcal{P}_b$ using acoustic and non-acoustic data to determine the area of interest. Again, an Instantaneous Location Estimation module 710 is configured to estimate the instantaneous location. An uncertainty computation module 720 is configured to conduct the uncertainty computation. Moreover, an Area of Interest Determination module 725 is configured to determine an area of interest. A Parameter Computation module 730 is configured to conduct the parameter computation.

In the following, inter alia, a parameter $\mathcal{P}_c$ based on proximity is provided.

The parameter $\mathcal{P}_c$ is based on the proximity of an object to a proximity sensor. Here the data of a proximity sensor is mapped to $\mathcal{P}_c(n)$ such that $\mathcal{P}_c(n)=1$ when an object is in the direct proximity of the proximity sensor and $\mathcal{P}_c(n)=P_{min}$ when no objects are in the proximity of the sensor, where $P_{min}$ is a pre-defined lower bound.

The parameter $\mathcal{P}_c$ that indicates the proximity can be derived from a classical proximity sensor (as used in many smartphones, see http://en.wikipedia.org/wiki/Proximity_sensor). Alternatively, the parameter can be based on the information of a depth sensor or time of flight sensor, which can tell that there is an object within R meters of the sensor.

In a particular embodiment, $\mathcal{P}_c$ may be implemented as a proximity parameter. The first speech probability estimator may implement a mapping to map the proximity parameter $\mathcal{P}_c$ to a value representing speech probability information, e.g. a speech probability value.

The proximity parameter $\mathcal{P}_c$ may, for example, have a first parameter value, (e.g., $\mathcal{P}_c=0.60$) when one or more possible sound sources within a predefined distance from a proximity sensor. Moreover, the proximity parameter $\mathcal{P}_c$ may have a second parameter value (e.g. $\mathcal{P}_c=0.40$), being smaller than the first parameter value, when no possible sound sources within a predefined distance from a proximity sensor. The proximity parameter $\mathcal{P}_c$ may, for example, take on any value between 0 and 1.0, e.g. depending on the proximity of detected objects.

The first speech probability estimator may be configured to determine a first speech probability value depending on $\mathcal{P}_c$.

Now, the determination of speech probability information is considered in general.

It is important to note that any combination (e.g., product, sum, weighted sum) of the parameters $\mathcal{P}_a$, $\mathcal{P}_b$ and/or $\mathcal{P}_c$ and other known parameters, e.g. $\mathcal{P}_{local}(k, n)$, $\mathcal{P}_{global}(k, n)$, and/or $\mathcal{P}_{frame}$ (can be used for obtaining the speech probability information by using the combiner. This also means that it is also possible to only use the parameters $\mathcal{P}_a$, $\mathcal{P}_b$ or $\mathcal{P}_c$ for obtaining the speech probability information.

Any possible combination of the parameters can be used, for example:

a) q=$\mathcal{P}_c$ (E.g., assume $\mathcal{P}_c$=0.7 when an object is in the proximity of the sensor. Then any active sound source (whether or not close) would be considered desired with an a priori SPP of 1−0.7=0.3.)

b) q=$\mathcal{P}_a\mathcal{P}_c$ (E.g., a sound is considered desired when there is an object close to the sensor and the DDR is sufficiently high)

c) q=$\mathcal{P}_b\mathcal{P}_c$ (E.g., a sound is considered desired when there is an object close to the sensor and the location of the sound source is within the area of interest, e.g., direction-of-arrival range)

d) q=$\mathcal{P}_a\mathcal{P}_b\mathcal{P}_c$ (E.g., a sound is considered desired when there is an object close to the sensor, the DDR of the observed sound is sufficiently high and the location of the sound source is within the area of interest).

In the following, embodiments of applications of the above-described concepts are provided.

Now, noise PSD Matrix Estimation is described.

In [2], a minima controlled recursive averaging (MCRA) noise PSD estimator was proposed that uses a soft-decision update rule based on the single-channel a posteriori SPP. Here the a priori SPP was computed using (8). A similar SPP estimator was proposed in [4], where a fixed a priori SPP and a fixed a priori SNR was used rather than signal dependent quantities as in [2]. Souden et al. [8], proposed a multichannel noise PSD matrix estimator that uses a multichannel SPP estimator [9]. In [8], the authors determine a priori SPP using the a priori SNR in a way similar to the MCRA noise PSD estimator.

A major shortcoming of the state-of-the-art multichannel SPP estimators is that they rely heavily on the estimate noise PSD matrix. If, for example, an air conditioning is switched or a distant speakers start to talk the signal levels increase and the SPP estimator will indicate that speech is present.

In this case, in contrast to conventional technology, embodiment still allow to make an accurate decision between what is desired and what is undesired.

Taking into account the speech presence uncertainty, a minimum mean square error (MMSE) estimate for the noise PSD matrix at a certain time-frequency bin is given by [8]

$$E\{v(k,n)v^H(k,n)|y(k,n)\}=p[H_0(k,n)|y(k,n)]E\{v(k,n)v^H(k,n)|y(k,n),H_0(k,n)\}+p[H_1(k,n)|y(k,n)]$$
$$E\{v(k,n)v^H(k,n)|y(k,n),H_1(k,n)\}, \quad (19)$$

where $p[H_0(k, n)|y(k, n)]$ indicated the conditional probability that the desired speech is absent and $p[H_1(k, n)|y(k, n)]$ denotes the conditional probability that the desired speech is present.

Figure 8:
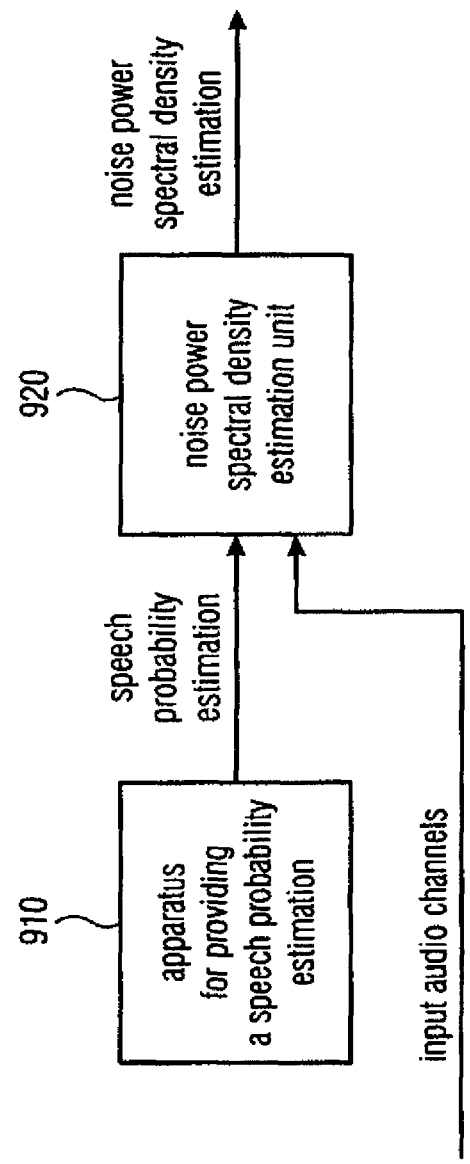
FIG. 8 illustrates an apparatus for determining a noise power spectral density estimation according to an embodiment.

FIG. 8 illustrates an apparatus for determining a noise power spectral density estimation according to an embodiment. The apparatus for determining a noise power spectral density estimation comprises an apparatus 910 for providing a speech probability estimation according to one of the above-described embodiments and a noise power spectral density estimation unit 920. The apparatus 910 for providing a speech probability estimation is configured to provide the speech probability estimation to the noise power spectral density estimation unit 920. The noise power spectral density estimation unit 920 is configured to determine the noise power spectral density estimation based on the speech probability estimation and based on a plurality of input audio channels.

Figure 9:
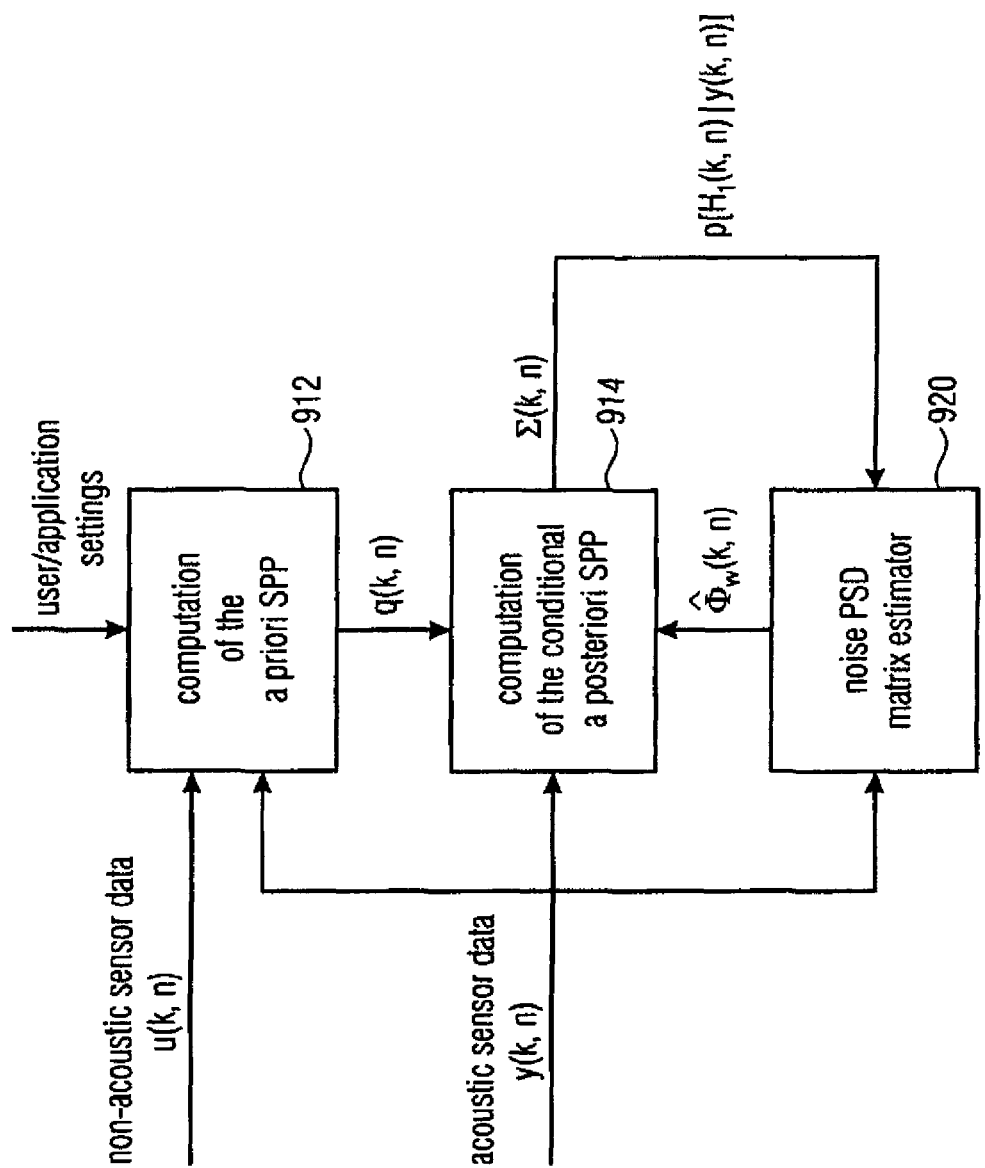
FIG. 9 illustrates a block diagram of the proposed noise PSD matrix estimator according to a further embodiment.

FIG. 9 illustrates a block diagram of a noise PSD matrix estimator according to a further embodiment. The noise PSD matrix estimator comprises a "Computation of the a priori SPP" module 912. The "Computation of the a priori SPP" module 912 may be a first speech probability estimator of the apparatus for providing a speech probability estimation. Moreover, the noise PSD matrix estimator comprises a "Computation of the Conditional a posteriori SPP" module 914. The "Computation of the Conditional a posteriori SPP" module 914 may be a second speech probability estimator of the apparatus for providing a speech probability estimation. Furthermore, the noise PSD matrix estimator comprises a "Noise PSD Matrix Estimation" unit 920.

According to embodiments, a noise estimation technique to approximate (19) is to use a weighted sum of recursively averaged instantaneous PSD matrix of the noisy observation, e.g., $y(k, n)y^H(k, n)$, and an estimate of the noise PSD of the previous frame, as described in [2, 4] for a single-channel case and in [9] for a multichannel case. This estimation technique can be expressed as follows $$\hat{\Phi}_{vv}(k,n) = p[H_0(k,n)|y(k,n)](\alpha_v(k,n)\hat{\Phi}_{vv}(k,n-1) + [1-\alpha_v(k,n)]y(k,n)y^H(k,n)) + p[H_1(k,n)|y(k,n)]\hat{\Phi}_{vv}(k,n-1), \quad (20)$$

where $\hat{\Phi}_{vv}(k, n)$ is the estimated noise PSD matrix and $0 \leq \alpha_v(k, n) < 1$ is a chosen smoothing parameter. Rearranging (20), the following update rule is obtained $$\hat{\Phi}_{vv}(k, n) = p[H_0(k, n) | y](1 - \alpha_v(k, n))y(k, n)y^H(k, n) + \quad (21)$$
$$(\alpha_v(k, n) + p[H_1(k, n) | y(k, n)][1 - \alpha_v(k, n)])\hat{\Phi}_{vv}(k, n-1)$$
$$= \alpha'(k, n)y(k, n)y^H(k, n) + [1 - \alpha'(k, n)]\hat{\Phi}_{vv}(k, n-1), \quad (22)$$

such that $\alpha' = p[H_0(k, n)|y(k, n)][1-\alpha_v(k, n)]$.

To further reduce the leakage of the desired speech into the noise PSD matrix estimate, we propose to compute $\alpha_v(k, n)$ based on the estimated parameters $\mathcal{P}_1 \ldots \mathcal{P}_P$.

In contrast to the algorithm in [4], the a priori SPP is based on the parameters $\mathcal{P}_1 \ldots \mathcal{P}_P$ and exploits temporal, spectral and spatial information deduced from acoustic as well as non-acoustic data. The proposed noise PSD matrix estimator is summarized in FIG. 10.

Now, a method for noise PSD matrix estimation according to an embodiment is provided. A noise PSD matrix estimator according to an embodiment may be configured to implement such a method.

1. Compute the parameters $\mathcal{P}_1, \ldots, \mathcal{P}_P$.
2. Compute the a priori SPP q(k, n) for the current frame using the parameters $\mathcal{P}_1, \ldots, \mathcal{P}_P$.
3. Determine the smoothing parameter $\alpha_v(k, n)$ based on the parameters $\mathcal{P}_1, \ldots, \mathcal{P}_P$.

4. Estimate $p[H_1(k, n)|y(k, n)]$ according to (5), using the estimated noise PSD matrix from the previous frame [e.g., $\Phi_{vv}(k, n-1)$] and the current estimate of $\Phi_{yy}(k, n)$:

$$\hat{\Phi}_{yy}(k,n) = \alpha_y(k,n)\hat{\Phi}_{yy}(k,n-1) + [1-\alpha_y(k,n)]y(k,n)y^H(k,n), \quad (23)$$

where $\alpha_y(k, n)$ denotes a smoothing constant.

5. Compute a recursively smoothed SPP as follows $$\bar{p}(k,n) = \alpha_p\bar{p}(k,n-1) + (1-\alpha_p)p[H_1(k,n)|y(k,n)], \quad (24)$$

where $\alpha_p$ denotes a smoothing constant.

6. Avoid stagnation of the noise PSD matrix update by setting $p[H_1(k, n)|y(k, n)]$ to a chosen maximum value $p_{max}$ whenever $\bar{p}(k, n) > p_{max}$.

7. Update the noise PSD matrix by using $p[H_1(k, n)|y(k, n)]$ and (22).

In the following, Steering Vector Estimation is considered.

Figure 10A:
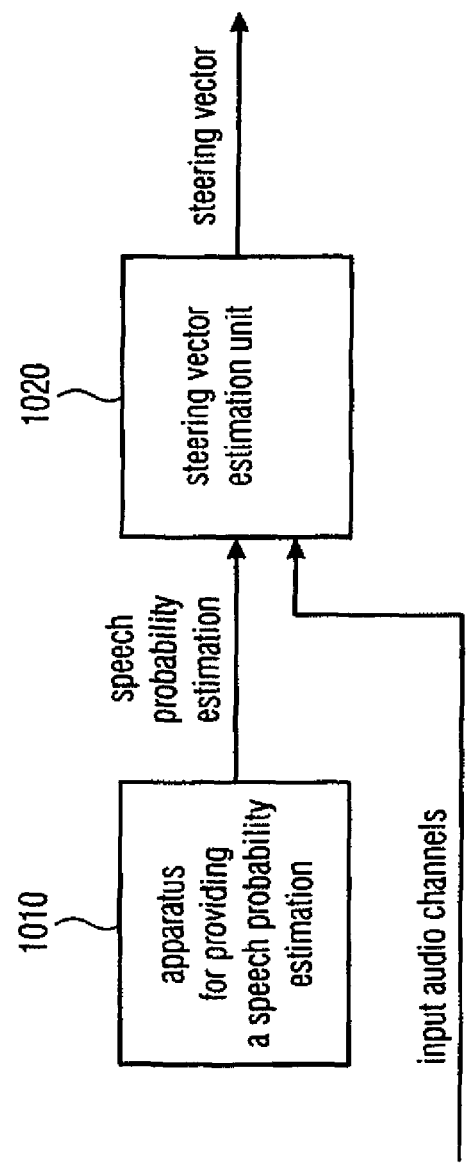
FIG. 10a illustrates an apparatus for estimating a steering vector according to an embodiment.

FIG. 10a illustrates an apparatus for estimating a steering vector. The apparatus for estimating a steering vector comprises an apparatus 1010 for providing a speech probability estimation according to one of the above-described embodiments and a steering vector estimation unit 1020. The apparatus 1010 for providing a speech probability estimation is configured to provide the speech probability estimation to the steering vector estimation unit 1020. The steering vector estimation unit 1020 is configured to estimate the steering vector based on the speech probability estimation and based on a plurality of input audio channels.

Figure 10B:
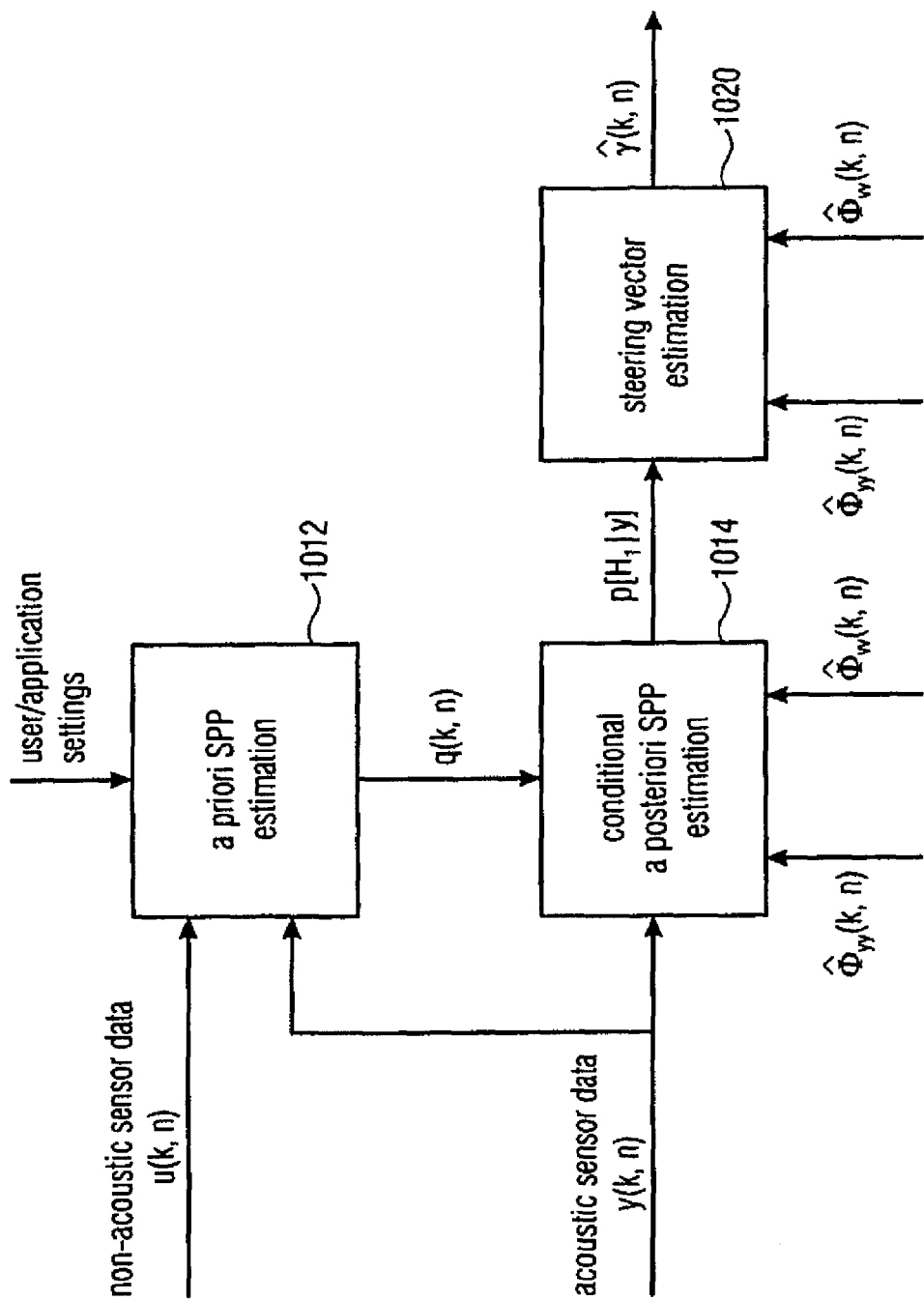
FIG. 10b illustrates a block diagram of a steering vector estimator according to an embodiment.

FIG. 10b illustrates a block diagram of an apparatus for estimating a steering vector according to a further embodiment. The apparatus for estimating a steering vector comprises an "a priori SPP Estimation" module 1012. The "a priori SPP Estimation" module 1012 may be a first speech probability estimator of the apparatus for providing a speech probability estimation. Moreover, the apparatus for estimating a steering vector comprises a "Conditional a posteriori SPP Estimation" module 1014. The "Conditional a posteriori SPP Estimation" module 1014 may be a second speech probability estimator of the apparatus for providing a speech probability estimation. Furthermore, the apparatus for estimating a steering vector comprises a "Steering Vector Estimation" unit 1020.

For some applications, the steering vector of the desired directional source is necessitated, in addition or instead of the noise PSD matrix. In [13], the single-channel SPP estimator was used to compute the steering vector for two acoustic sensors. The steering vector related to the desired signal received by the i-th acoustic sensor is defined as $$\gamma_i(k, n) = \frac{E\{x(k, n)X_i^*(k, n)\}}{E\{|X_i(k, n)|^2\}} \quad (25)$$
$$= \phi_{x_ix_i}^{-1}(k, n)\Phi_{xx}(k, n)u_i,$$

where $(\cdot)^*$ denotes the conjugation operator, $\phi_{x_ix_i}(k, n) = E\{|X_i(k, n)|^2\}$, and $$u_i = \begin{bmatrix} \underbrace{0 \ldots 0}_{i-1} & 1 & \underbrace{0 \ldots 0}_{M-i} \end{bmatrix}^T. \quad (26)$$

Clearly, the steering vector can be obtained by taking the i-th column of $\hat{\Phi}_{xx}(k, n)$ and dividing it by the i-th element of $\hat{\Phi}_{xx}(k, n)u_i$. By definition, the i-th element of the steering vector $\gamma_i(k, n)$ is equal to one.

Using (4), the source PSD matrix can be expressed as $\Phi_{xx}(k, n)=\Phi_{yy}(k, n)-\Phi_{vv}(k, n)$. Therefore, the steering vector $\gamma_i(k, n)$ can be expressed as $$\gamma_i(k, n) = \frac{E\{y(k, n)Y_i^*(k, n)\} - E\{v(k, n)V_i^*(k, n)\}}{E\{|Y_i(k, n)|^2\} - E\{|V_i(k, n)|^2\}}. \quad (27)$$

The terms in the numerator can be obtained as the i-th column of the matrices $\hat{\Phi}_{yy}(k, n)$ and $\hat{\Phi}_{vv}(k, n)$, whereas the terms in the denominator as the i-th element of the column vectors $\hat{\Phi}_{vv}(k, n)u_i$ and $\hat{\Phi}_{vv}(k, n)u_i$. Alternatively, the steering vector $\gamma_i$ can be obtained by computing the generalized eigenvalue decomposition of the matrix pair $(\Phi_{yy}, \Phi_{xx})$. For the j-th generalized eigenvalue and eigenvector pair $(\lambda_j, b_j)$, the following holds $$\Phi_{yy}(k,n)b_j = \lambda_j b_j, \quad (28)$$

which using (4) can be written as $$[\Phi_{xx}(k,n)+\Phi_{vv}(k,n)]b_j = \lambda_j b_j, \quad (29)$$

Rearranging (29), and recalling the rank one property of the $\Phi_{xx}$ (i.e., $\Phi_{xx}=\phi_{x_ix_i}\gamma_i\gamma_i^H$), it follows $$\phi_{x_ix_i}(k,n)\gamma_i(k,n)\gamma_i^H(k,n)b_j = (\lambda_j-1)\Phi_{vv}(k,n)b_j, \quad (30)$$

which is equivalent to $$\gamma_i(k, n) = \frac{\lambda_j - 1}{\gamma_i^H(k, n)b_j\phi_{x_ix_i}(k, n)}\Phi_{vv}(k, n)b_j. \quad (31)$$

From (31), it can be concluded that if $\lambda_j \neq 1$, the steering vector $\gamma_i(k, n)$ represents a rotated and scaled version of the eigenvector $b_j$. However, due to the rank one assumption there a unique eigenvalue $\lambda_i$ that is not equal to 1 and hence the eigenvector $b_j$ is uniquely determined. Eventually, in order to avoid the scaling ambiguity $\gamma_i(k, n)$ can be normalized as follows $$\gamma_i(n, k) = \frac{\Phi_{vv}(k, n)b_j}{[\Phi_{vv}(k, n)b_j]_i} \quad (32)$$

where $[\Phi_{vv}(k, n)b_j]_i$ is the i-th element of the vector $\Phi_{vv}(k, n)b_j$. Using the informed multichannel SPP estimator, the steering vector is estimated recursively as follows $$\hat{\gamma}_i(k,n)=\alpha'(k,n)\gamma_i(k,n)+[1-\alpha'(k,n)]\hat{\gamma}_i(k,n-1) \quad (33)$$

where $\alpha'(k, n)=p[H_1(k, n)|y(k, n)][1-\alpha_x(k, n)]$ and $0<\alpha_x(k, n)<1$ is an appropriately chosen smoothing constant. The smoothing constant $\alpha_x$ is time and frequency dependent and is controlled by $\mathcal{P}_1, \mathcal{P}_2, \ldots, \mathcal{P}_P$ to minimize the update rate of the steering vector when, for example, the SNR or DDR is too low.

In the following, multichannel noise reduction is explained.

Figure 11:
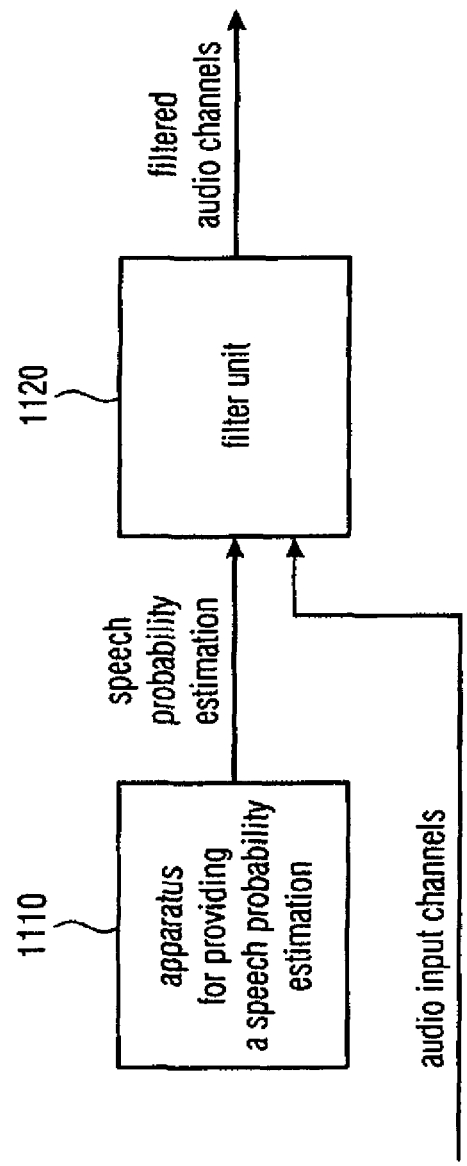
FIG. 11 illustrates an apparatus for multichannel noise reduction according to an embodiment.

FIG. 11 illustrates an apparatus for multichannel noise reduction according to an embodiment. The apparatus for multichannel noise reduction comprises an apparatus 1110 for providing a speech probability estimation according to one of the above-described embodiments and a filter unit 1120. The filter unit 1120 is configured to receive a plurality of audio input channels. The apparatus 1110 for providing a speech probability estimation is configured to provide the speech probability information to the filter unit 1120. The filter unit 1120 is configured to filter the plurality of audio input channels to obtain filtered audio channels based on the speech probability information.

Multichannel noise reduction according to embodiments is now explained in more detail.

An SPP estimator is often used in the context of multichannel noise reduction [6, 7, 14]. The informed multichannel SPP estimator according to embodiments can be used similarly. In addition, the parameters used to compute a priori SPP can be used to control the tradeoff between noise reduction and speech distortion.

Considering the i-th acoustic sensor as a reference, the time-frequency domain parametric multichannel Wiener filter (PMWF) is given by [15-17]

$$h_{W,\beta}(k, n) = \frac{\Phi_{vv}^{-1}(k, n)\Phi_{xx}(k, n)}{\beta(k, n) + tr\{\Phi_{vv}^{-1}(k, n)\Phi_{xx}(k, n)\}}u_i, \quad (34)$$

where $\beta(k, n)$ is the tradeoff parameter.

Well-known (spatial) filters are special cases of a parametric multichannel Wiener filter (PMWF). For example, the minimum variance distortionless response (MVDR) filter is obtained with $\beta=0$ and the multichannel Wiener filter (MWF) is obtained with $\beta=1$. It should be noted that (34) can be expressed in different ways and can be decomposed into an MVDR filter and a single-channel parametric Wiener filter (see for example [14, 18] and the references therein). Further, the spatial filter can be expressed using the steering vector and PSD matrices. A major advantage of the filter in (34) is that it does not dependent on the steering vector (a.k.a. array manifold vector or propagation vector) related to the desired source.

An estimate of the desired signal as received by the i-th acoustic sensor is obtained by $$\hat{X}_i(k,n)=h_{W,\beta}^H(k,n)y(k,n). \quad (35)$$

Under the speech presence uncertainty, the estimate of the desired signal can be obtained according to $$\hat{X}_i(k,n)=p[H_1(k,n)|y(k,n)]h_{W,\beta}^H(k,n)y(k,n)+p[H_0(k,n)|y(k,n)]G_{min}(k)Y_i(k,n), \quad (36)$$

where the second term on the right hand side mitigates speech distortions in case of a false-negative decision. The gain factor $G_{min}(k)$ determines the maximum amount of noise reduction when the desired speech is assumed to be inactive.

If the MMSE estimator is applied for both the case of speech presence and absence and desire that in the speech present case, the objective is to minimize the distortion of the desired speech while in the speech absent case, the objective is to minimize the residual noise at the output of the filter, then we find (34) with the tradeoff parameter [6, 7]

$$\beta(k, n) = \frac{p[H_0(k, n)|y(k, n)]}{p[H_1(k, n)|y(k, n)]} \quad (37)$$

$$= \frac{1 - p[H_1(k, n)|y(k, n)]}{p[H_1(k, n)|y(k, n)]}.$$

such that $\beta=0$ (such that the PMWF is equal to an MVDR filter) when the a posteriori SPP $p[H_1(k, n)|y(k, n)]=1$, $\beta=1$ such that the PMWF is equal to an MWF) when $p[(H_1(k, n)|y(k, n)]=0.5$, and $\beta$ approaches infinity when the a posteriori SPP $p[H_1(k, n)|y(k, n)]$ approaches zero. Hence, in the latter case, the residual noise power also reduces to zero.

Figure 12:
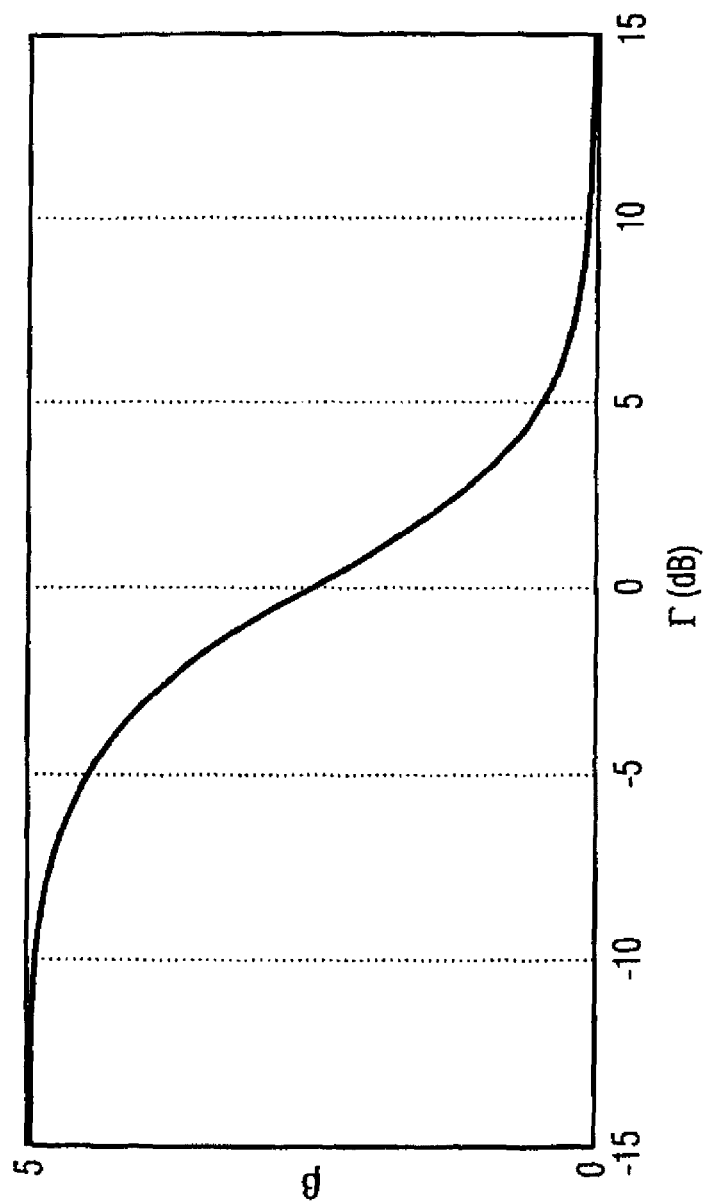
FIG. 12 illustrates a mapping of the DDR to the tradeoff parameter $\beta=1-\text{Pa}$ ($l_{min}=0$, $l_{max}=5$, $\rho=2$, $c=0$)

FIG. 12 illustrates a mapping of the DDR to the tradeoff parameter with $\beta=1-\mathcal{P}_a$ ($l_{min}=0$, $l_{max}=5$, $\rho=2$, $c=0$).

Direct application to the a priori SPP might often lead to unwanted audible distortions of the desired signal. The invention includes a PMWF in which the tradeoff parameter depends on a combination (e.g., weighted sum, product, maximum ratio combiner, etc.) of the parameters $\mathcal{P}_1, \mathcal{P}_p, \ldots, \mathcal{P}_P$. The mapping functions used to combine the parameters can be different from the ones used to compute the a priori SPP.

For example, one can control the tradeoff parameter using parameter $\mathcal{P}_a(k, n)$ that reflects the directionality of the observed sound such that $\beta(k, n)=1-\mathcal{P}_a(k, n)$. The parameters $l_{min}$, $l_{max}$, $\rho$ and c are chosen such that we obtain $\beta(k, n)>1$ when the estimated DDR is low to achieve a larger amount of noise reduction compared to the standard MWF, and $\beta(k, n)\approx0$ (e.g., approximately equal to the MVDR filter [16]) when the estimated DDR is high, to avoid speech distortion. An example of the mapping function for the tradeoff parameter $\beta$ is depicted in FIG. 12 with $\beta=1-\mathcal{P}_a$ ($l_{min}=0$, $l_{max}=5$, $\rho=2$, $c=0$).

In a more general embodiment, the tradeoff parameter $\beta(k, n)$ depends on at least spatial information about the sound field or spatial information on the scene.

In a particular embodiment, the tradeoff parameter $\beta(k, n)$ is defined by $\beta(k, n)=f[q(k, n)]$, where q denotes the output of the first speech probability estimator.

In a specific embodiment, the tradeoff parameter $\beta(k, n)$ is defined by $\beta(k, n)=1-f[\Gamma(k, n)]$.

In the following, the performance of the proposed algorithm in terms of the achieved speech enhancement at the output of the PMWF is evaluated. At first, the setup and performance measures are described.

The analysis was carried out for different SNRs and a reverberation time of 300 ms. Two different types of noise were used: stationary noise with a long-term PSD equal to the long-term PSD of speech and non-stationary babble noise. In both cases, the CC of the noise signals corresponds to the CC of an ideal diffuse field [21].

The sampling frequency was 16 kHz, and the frame length was $L=512$ samples. The simulation was performed for a uniform linear array of $M=4$ microphones with an inter-microphone spacing of $d=2.3$ cm. The desired signals were obtained by convolving 45 s of clean speech with room impulse responses (RIRs) that were generated using an efficient implementation of the image-source model [22]. The PSDs necessitated for the DDR estimate are approximated by averaging over 15 time frames. For these experiments we used the q and $\beta$ mappings with the parameters as illustrated in FIGS. 5 and 12a. The smoothing parameters $\alpha$ used in the recursive averaging $\alpha_v$, $\alpha_y$ and $\alpha_p$ were chosen as 0.75, 0.8 and 0.9, respectively. The PESQ (Perceptual Evaluation of Speech Quality) score improvement [23] and the segmental SNR gain at the output of different beamformers steered by the estimated noise PSD matrix were studied. The PESQ improvement is computed as the difference in PESQ score of the inverse STFT of $\hat{X}_1$ and the inverse STFT of $Y_1$. The segmental SNR was obtained by splitting the signals into non-overlapping segments of 10 ms and averaging over the obtained SNR values in dB. The segmental SNRs at the input and at the output are denoted by $S_i$ and $S_o$, respectively. We compare the performance of the standard MVDR and Wiener beamformers, the DDR-controlled PMWF, and the estimate by (36) with $i=1$.

Figure 13:
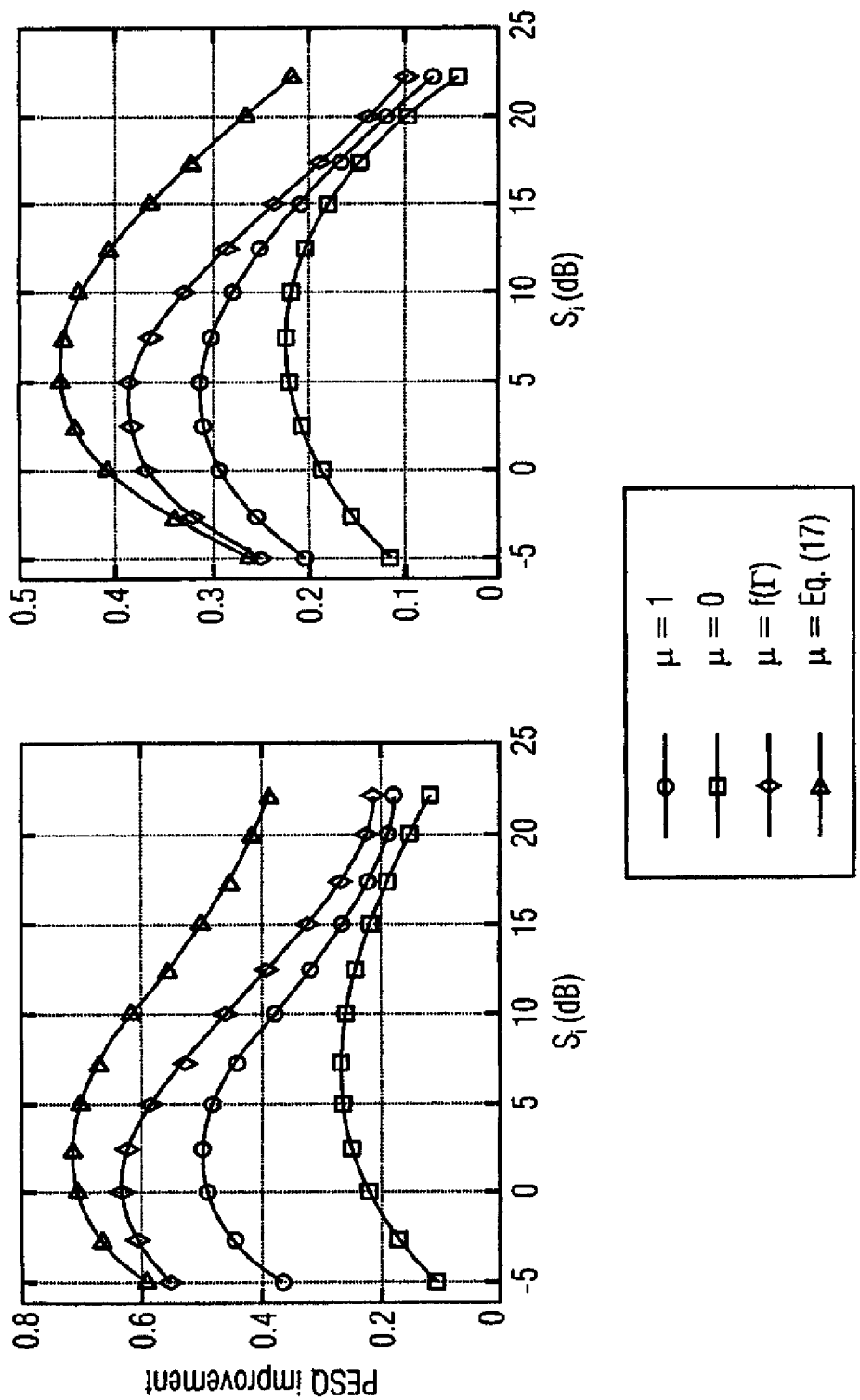
FIG. 13 illustrates PESQ improvement for stationary (left) and babble noise (right)
Figure 14:
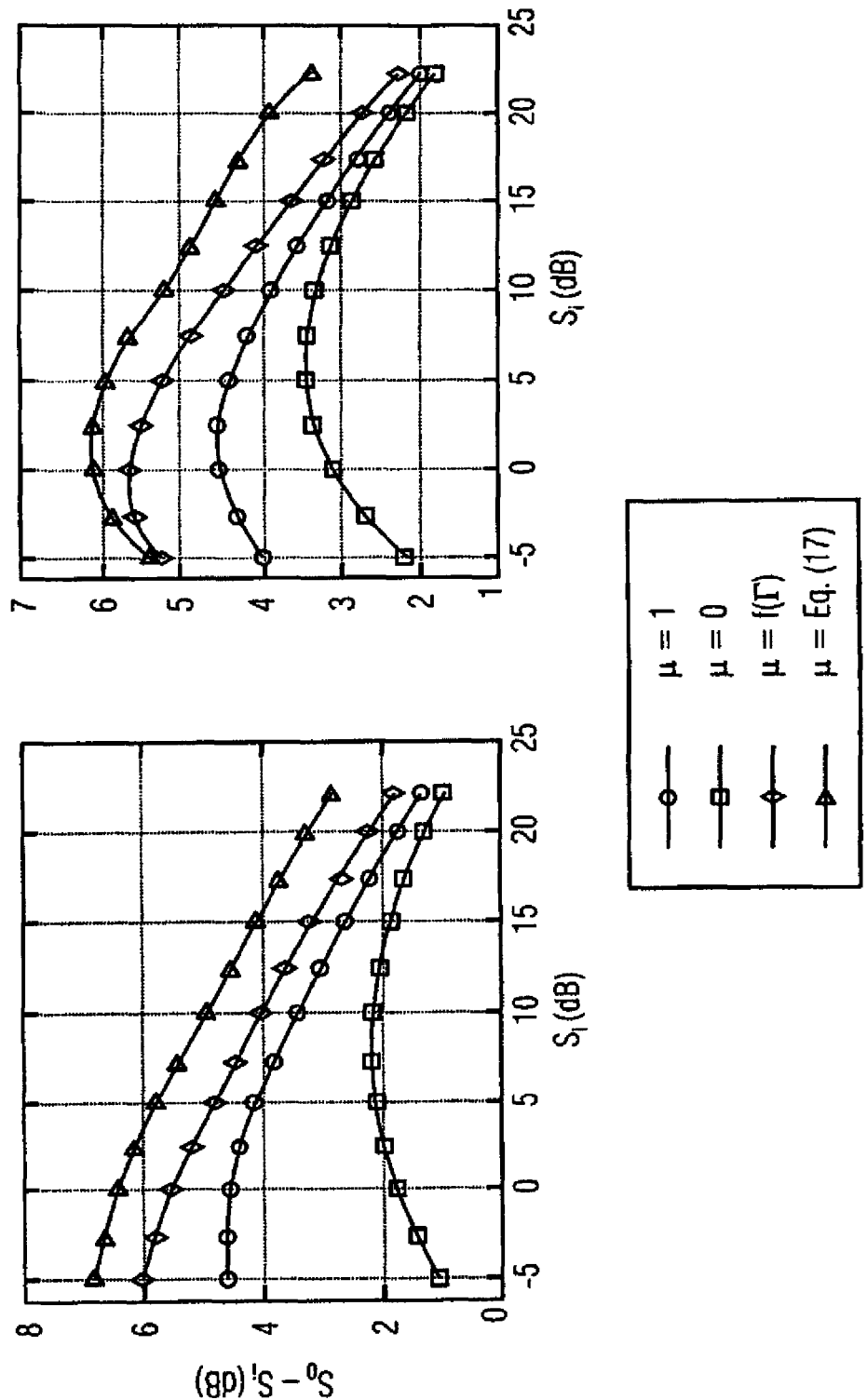
FIG. 14 illustrates SNR gain for stationary (left) and babble noise (right)
Figure 15C:
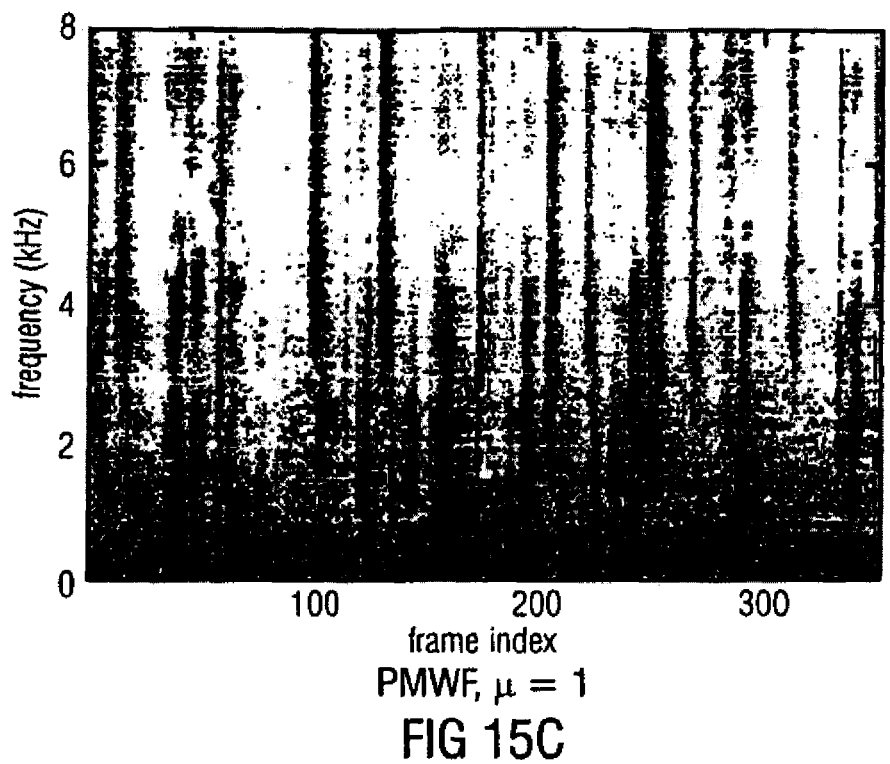
Figure 15D:
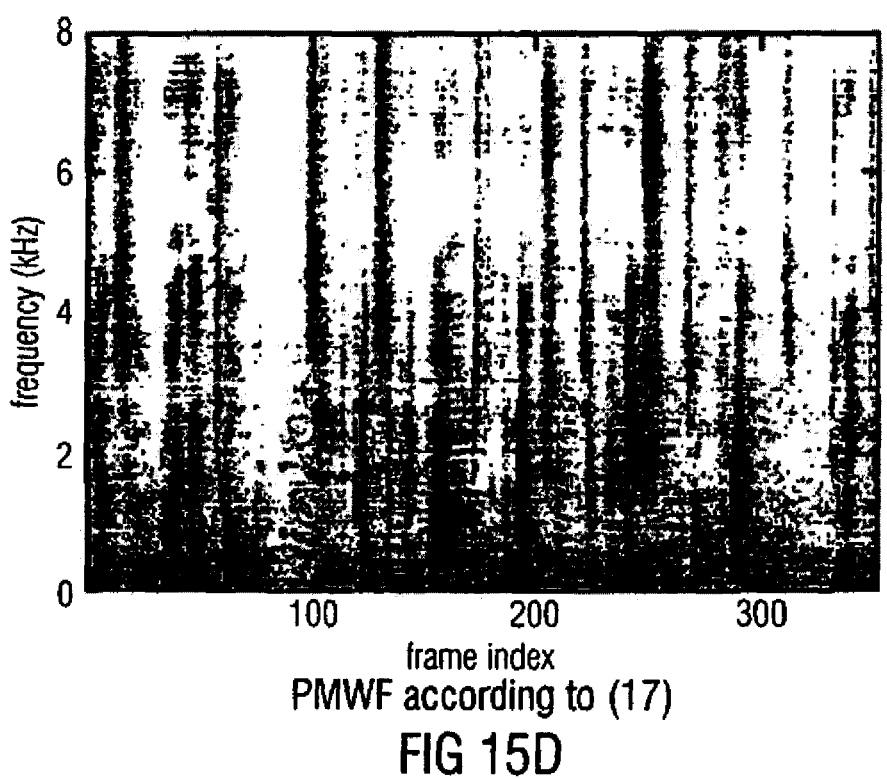

Now, the results are presented. The PESQ improvement at the output of the beamformers is illustrated in FIG. 13 as a function of the input SNR $S_i$. It can be seen that the proposed MMSE estimator outperforms the standard beamformers. In addition, the DDR-controlled PMWF performs better than the two beamformers with a fixed trade-off. The algorithm leads to a significant PESQ improvement in the case of babble noise, which due to its non-stationarity represents a challenging problem for many algorithms. The corresponding segmental SNR gains are shown in FIG. 14.

Figure 16A:
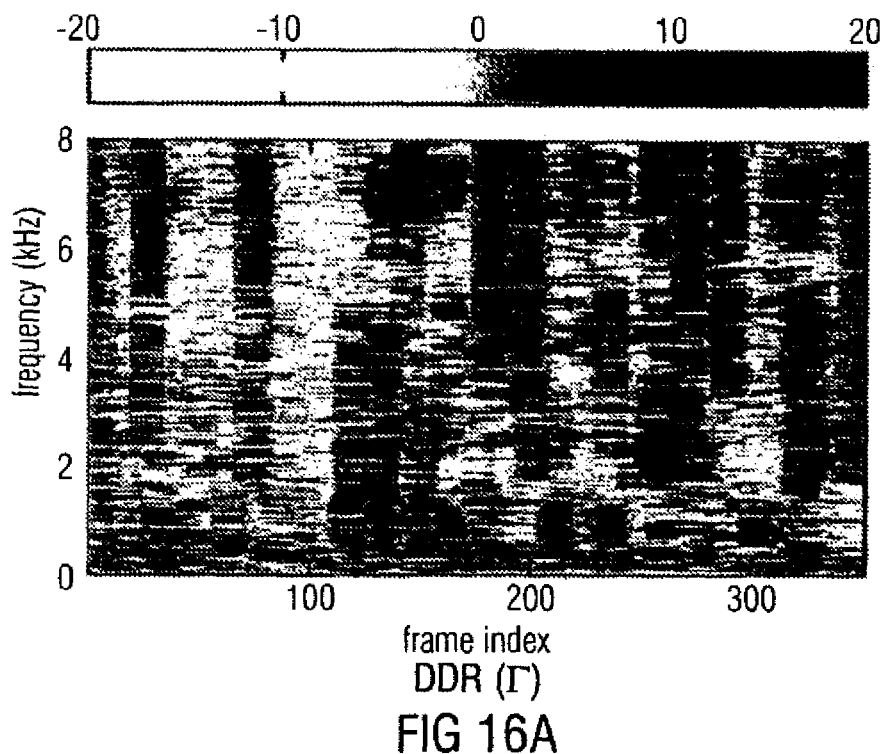
FIGS. 16A and 16B illustrate estimated DDR and the corresponding SPP ($S_i=11$ dB).
Figure 16B:
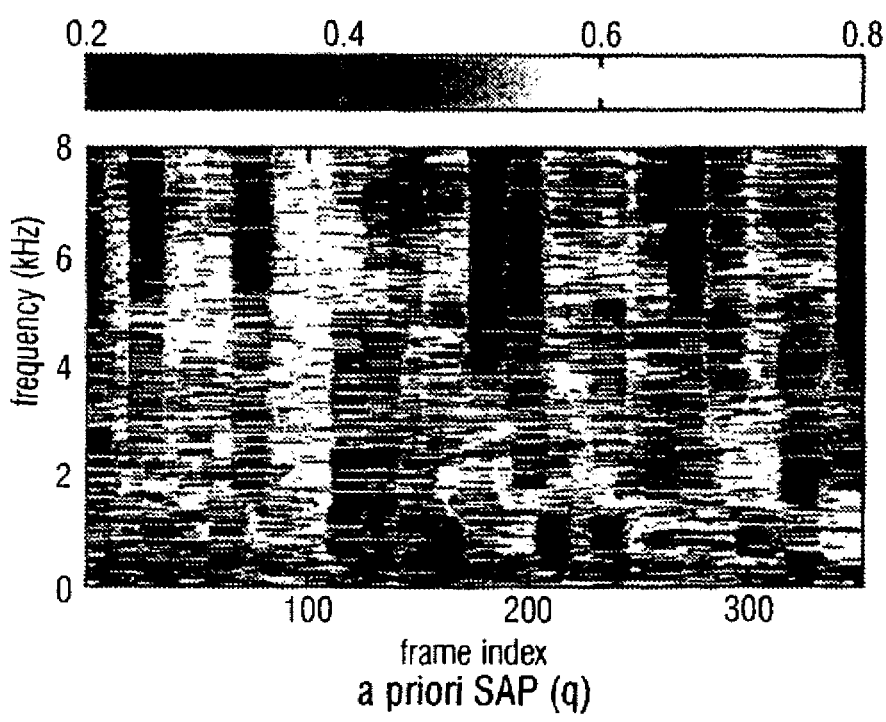

Spectrograms of the desired source signal at the first microphone, the received noisy signal, the standard MWF and the MMSE-based estimate are illustrated in FIGS. 15A-15D, for an excerpt of 11 s. The corresponding mapping from the estimated DDR to the a priori SPP is shown in FIGS. 16A and 16B. It can be seen that the SPP is correctly estimated at high frequencies as well, therefore preserving the speech signal at these frequencies where the input SNR is low.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] I. Cohen and B. Berdugo, "Noise estimation by minima controlled recursive averaging for robust speech enhancement," IEEE Signal Process. Lett., vol. 9, no. 1, pp. 12-15, January 2002.

[2] I. Cohen, "Noise spectrum estimation in adverse environments: Improved minima controlled recursive averaging," IEEE Trans. Speech Audio Process., vol. 11, no. 5, pp. 466-475, September 2003.

[3] "Apparatus and method for computing speech absence probability, and apparatus and method removing noise using computation apparatus and method," U.S. Pat. No. 7,080,007 B2, Jul. 18, 2006.

[4] T. Gerkmann and R. C. Hendriks, "Noise power estimation base on the probability of speech presence," in Proc. IEEE Workshop on Applications of Signal Processing to Audio and Acoustics, New Paltz, N.Y., 2011.

[5] "Wind noise suppression," US Patent Application Publication Pub. No. US 2011/0103615 A1, May 5, 2011.

[6] K. Ngo, A. Spriet, M. Moonen, J. Wouters, and S. Jensen, "Incorporating the conditional speech presence probability in multi-channel Wiener filter based noise reduction in hearing aids," EURASIP Journal on Applied Signal Processing, vol. 2009, p. 7, 2009.

[7] T. Yu and J. Hansen, "A speech presence microphone array beamformer using model based speech presence probability estimation," in Proc. IEEE Intl. Conf. on Acoustics, Speech and Signal Processing (ICASSP), 2009, pp. 213-216.

[8] M. Souden, J. Chen, J. Benesty, and S. Affes, "An integrated solution for online multichannel noise tracking and reduction," IEEE Trans. Audio, Speech, Lang. Process., vol. 19, pp. 2159-2169, 2011.

[9] M. Souden, J. Chen, J. Benesty, and S. Affes, "Gaussian model-based multichannel speech presence probability," IEEE Transactions on Audio, Speech, and Language Processing, vol. 18, no. 5, pp. 1072-1077, July 2010.

[10] I. Cohen and B. Berdugo, "Microphone array postfiltering for non-stationary noise suppression," in Proc. IEEE Intl. Conf. on Acoustics, Speech and Signal Processing (ICASSP), Orlando, Fla., USA, May 2002, pp. 901-904.

[11] "Method for estimating priori SAP based on statistical model," US Patent Application Publication Pub. No. US 2008/0082328 A1, Apr. 3, 2008.

[12] O. Thiergart, G. D. Galdo, and E. A. P. Habets, "Signal-to-reverberant ratio estimation based on the complex spatial coherence between omnidirectional microphones," in Proc. IEEE Intl. Conf. on Acoustics, Speech and Signal Processing (ICASSP), 2012, pp. 309-312.

[13] I. Cohen, "Relative transfer function identification using speech signals," IEEE Trans. Speech Audio Process., vol. 12, no. 5, pp. 451 {459, September 2004.

[14] S. Gannot and I. Cohen, "Adaptive beamforming and postfiltering," in Springer Handbook of Speech Processing, J. Benesty, M. M. Sondhi, and Y. Huang, Eds. Springer-Verlag, 2007, ch. 48.

[15] A. Spriet, M. Moonen, and J. Wouters, "Spatially pre-processed speech distortion weighted multi-channel Wiener filtering for noise reduction," Signal Processing, vol. 84, no. 12, pp. 2367-2387, December 2004.

[16] J. Benesty, J. Chen, and Y. Huang, Microphone Array Signal Processing. Berlin, Germany: Springer-Verlag, 2008.

[17] S. Mehrez, J. Benesty, and S. Affes, "On optimal frequency-domain multichannel linear filtering for noise reduction," IEEE Trans. Audio, Speech, Lang. Process., vol. 18, no. 2, pp. 260-276, 2010.

[18] J. Benesty, J. Chen, and E. A. P. Habets, Speech Enhancement in the STFT Domain, ser. SpringerBriefs in Electrical and Computer Engineering. Springer-Verlag, 2011.

[19] Henry Stark, John W. Woods: Probability and Random Processes with Applications to Signal Processing

[20] A. Papoulis, U. Pillai: Probability, Random Variables and Stochastic Processes

[21] E. A. P. Habets, I. Cohen, and S. Gannot, "Generating nonstationary multisensor signals under a spatial coherence constraint," Journal Acoust. Soc. of America, vol. 124, no. 5, pp. 2911-2917, November 2008

[22] E. A. P. Habets, "Room impulse response generator," Tech. Rep., Technische Universiteit Eindhoven, 2006.

[23] A. Rix, J. Beerends, M. Hollier, and A. Hekstra, "Perceptual evaluation of speech quality (PESQ)—a new method for speech quality assessment of telephone networks and codecs," in Proc. IEEE Intl. Conf. on Acoustics, Speech and Signal Processing (ICASSP), 2001, vol. 2, pp. 749-752.

[24] G. W. Elko, "Spatial coherence functions," in Microphone Arrays: Signal Processing Techniques and Applications, M. Brandstein and D. Ward, Eds., chapter 4, pp. 61-85. Springer-Verlag, 2001.

The invention claimed is:

1. An apparatus for providing a speech probability estimation, comprising:

a first speech probability estimator for estimating speech probability information indicating a first probability on whether a sound field of a scene comprises speech or on whether the sound field of the scene does not comprise speech, wherein the first speech probability estimator is configured to estimate the speech probability information based on at least spatial information about the sound field or spatial information on the scene, and a second speech probability estimator for estimating the speech probability estimation indicating a second probability on whether the sound field comprises speech or on whether the sound field does not comprise speech, wherein the second speech probability estimator is configured to estimate the speech probability estimation based on the speech probability information estimated by the first speech probability estimator, and based on one or more acoustic sensor signals, which depend on the sound field, and an output interface for outputting the speech probability estimation, wherein at least one of the first speech probability estimator and the second speech probability estimator and the output interface is implemented using a hardware apparatus or a computer or a combination of a hardware apparatus and a computer.

2. An apparatus according to claim 1, wherein the first speech probability estimator is configured to estimate the speech probability information based on directionality information, wherein the directionality information indicates how directional sound of the sound field is, wherein the first speech probability estimator is configured to estimate the speech probability information based on location information, wherein the location information indicates at least one location of a sound source of the scene, or wherein the first speech probability estimator is configured to estimate the speech probability information based on proximity information, wherein the proximity information indicates at least one proximity of at least one possible sound object to at least one proximity sensor.

3. An apparatus according to claim 1, wherein the first speech probability estimator is configured to estimate the speech probability estimation by determining a direct-to-diffuse ratio estimation of a direct-to-diffuse ratio as the spatial information, the direct-to-diffuse ratio indicating a ratio of direct sound comprised by the acoustic sensor signals to diffuse sound comprised by the acoustic sensor signals.

4. An apparatus according to claim 3, wherein the first speech probability estimator is configured to determine the direct-to-diffuse ratio estimation by determining a coherence estimation of a complex coherence between a first acoustic signal of the acoustic sensor signals, the first acoustic signal being recorded by a first acoustic sensor p, and a second acoustic signal of the acoustic sensor signals, the second acoustic signal being recorded by a second acoustic sensor q, and wherein the first speech probability estimator is moreover configured to determine the direct-to-diffuse ratio based on a phase shift estimation of a phase shift of the direct sound between the first acoustic signal and the second acoustic signal.

5. An apparatus according to claim 4, wherein the first speech probability estimator is configured to determine the direct-to-diffuse ratio estimation $\hat{\Gamma}(k, n)$ between the first acoustic signal and the second acoustic signal by applying the formula:

$$\hat{\Gamma}(k, n) = \Re\left\{\frac{\Gamma_{pq,\text{diff}}(k) - \hat{\Gamma}_{pq}(k, n)}{\hat{\Gamma}_{pq}(k, n) - e^{j\hat{\theta}(k,n)}}\right\}$$

wherein $\hat{\Gamma}_{pq}(k, n)$ is the coherence estimation of the complex coherence between the first acoustic signal and the second acoustic signal with respect to a time-frequency bin (k, n), wherein n denotes time and wherein k denotes frequency, wherein $\theta(k, n)$ is the phase shift estimation of the phase shift of the direct sound between the first acoustic signal and the second acoustic signal with respect to the time-frequency bin (k, n), and wherein $\Gamma_{pq,\text{diff}}(k)$ corresponds to the spatial coherence between the acoustic sensor p and the acoustic sensor q in a pure diffuse sound field.

6. An apparatus according to claim 3, wherein the first speech probability estimator is configured to estimate the speech probability information by determining $f[\hat{\Gamma}(k, n)]$ wherein $\hat{\Gamma}(k, n)$ is the direct-to-diffuse ratio estimation, and wherein $f[\hat{\Gamma}(k, n)]$ is a mapping function representing a mapping of the direct-to-diffuse ratio estimation to a value between 0 and 1.

7. An apparatus according to claim 6, wherein the mapping function $f[\hat{\Gamma}(k, n)]$ is defined by the formula:

$$f[\hat{\Gamma}(k, n)] = l_{max} - (l_{max} - l_{min})\frac{10^{c\rho/10}}{10^{c\rho/10} + \hat{\Gamma}(k, n)^\rho}$$

wherein $l_{min}$ is a minimum value of the mapping function, wherein $l_{max}$ is a maximum value of the mapping function, wherein c is a value for controlling the offset along the $\Gamma$ axis, and wherein $\rho$ defines the steepness of transition between $l_{min}$ and $l_{max}$.

8. An apparatus according to claim 1, wherein the first speech probability estimator is configured to determine a location parameter $\mathcal{P}_b$ based on a probability distribution of an estimated location of a sound source and based on an area of interest to acquire the speech probability information.

9. An apparatus according to claim 8, wherein the first speech probability estimator is configured to determine the location parameter $\mathcal{P}_b$ by employing the formula $$\mathcal{P}_b = \int_{\Omega \in S} \frac{p(\hat{\Omega} | \Omega; \Sigma_\Omega) p(\Omega)}{p(\hat{\Omega})} \mathcal{R}(\Omega) d\Omega,$$

wherein $\Omega$ is a specific location, wherein $\hat{\Omega}$ is an estimated location, wherein $p(\hat{\Omega}|\Omega; \Sigma_\Omega)$ is a conditional probability density function, and wherein $p(\Omega)$ is the prior probability density function of $\Omega$, and wherein $p(\hat{\Omega})$ is the probability density function of $\hat{\Omega}$, and wherein $\Sigma_\Omega$ denotes the uncertainty associated with of the estimates of $\Omega$, and wherein $\mathcal{R}(\Omega)$ is a multidimensional function that describes an area of interest, wherein $0 \leq \mathcal{R}(\Omega) \leq 1$.

10. An apparatus according to claim 3, wherein the first speech probability estimator is configured to determine an a priori speech presence probability q(k, n) as the speech probability information by applying the formula:

$$q(k, n) = f[\Gamma(k, n)] \cdot \int_{-\pi}^{\pi} \frac{p(\theta | \hat{\theta}; \sigma) p(\theta)}{p(\hat{\theta})} \mathcal{R}(\theta) d\theta,$$

wherein θ is a specific direction of arrival, and wherein $\hat{\theta}$ is an estimated direction of arrival, wherein $p(\theta|\hat{\theta};\ \sigma)$ is a conditional probability density function, and wherein $p(\theta)$ is the prior probability density function of θ, and wherein $p(\hat{\theta})$ is the probability density function of $\hat{\theta}$, and wherein σ denotes the uncertainty associated with of the estimates of θ, and wherein $f[\hat{\Gamma}(k,\ n)]$ represents a mapping of the direct-to-diffuse ratio estimation $\hat{\Gamma}(k,\ n)$ to a value between 0 and 1, and wherein $\mathcal{R}(\theta)$ is a multidimensional function that describes an area of interest, wherein $0 \leq \mathcal{R}(\theta) \leq 1$.

11. An apparatus according to claim 1, wherein the first speech probability estimator is configured to determine a proximity parameter as the spatial information, wherein the proximity parameter comprises a first parameter value, when the first speech probability estimator detects one or more possible sound sources within a predefined distance from a proximity sensor, and wherein the proximity parameter comprises a second parameter value, being smaller than the first parameter value, when the first speech probability estimator does not detect possible sound sources in the direct proximity of the proximity sensor, and wherein the first speech probability estimator is configured to determine a first speech probability value as the speech probability information when the proximity parameter comprises the first parameter value, and wherein the first speech probability estimator is configured to determine a second speech probability value as the speech probability information when the proximity parameter comprises the second parameter value, the first speech probability value indicating a first probability that the sound field comprises speech, wherein the first probability is greater than a second probability that the sound field comprises speech, the second probability being indicated by the second speech probability value.

12. An apparatus according to claim 1, further comprising:

a noise power spectral density estimation unit, wherein the apparatus is configured to provide the speech probability estimation to the noise power spectral density estimation unit, and wherein the noise power spectral density estimation unit is configured to determine the noise power spectral density estimation based on the speech probability estimation and a plurality of input audio channels.

13. An apparatus according to claim 12, wherein the apparatus is configured to compute one or more spatial parameters, the one or more spatial parameters indicating spatial information about the sound field, wherein the apparatus is configured to compute the speech probability estimation by employing the one or more spatial parameters, and wherein the noise power spectral density estimation unit is configured to determine the noise power spectral density estimation by updating a previous noise power spectral density matrix depending on the speech probability estimation to acquire an updated noise power spectral density matrix as the noise power spectral density estimation.

14. An apparatus according to claim 1, further comprising:

a steering vector estimation unit, wherein the apparatus is configured to provide the speech probability estimation to the steering vector estimation unit, and wherein the steering vector estimation unit is configured to estimate the steering vector based on the speech probability estimation and a plurality of input audio channels.

15. An apparatus according to claim 1, further comprising:

a filter unit, wherein the filter unit is configured to receive a plurality of audio input channels, wherein the apparatus is configured to provide the speech probability information to the filter unit, and wherein the filter unit is configured to filter the plurality of audio input channels to acquire filtered audio channels based on the speech probability information.

16. An apparatus according to claim 15, wherein the first speech probability estimator of the apparatus according to claim 1 is configured to generate a tradeoff parameter, wherein the tradeoff parameter depends on at least one spatial parameter indicating spatial information about the sound field or spatial information on the scene.

17. An apparatus according to claim 16, wherein the filter unit is configured to filter the plurality of audio input channels depending on the tradeoff parameter.

18. A method for providing a speech probability estimation, comprising:

estimating speech probability information by a first speech probability estimator, wherein the speech probability information indicates a first probability on whether a sound field of a scene comprises speech or on whether the sound field of the scene does not comprise speech, wherein estimating the speech probability information is conducted based on at least spatial information about the sound field or spatial information on the scene, estimating the speech probability estimation by a second speech probability estimator, wherein the speech probability estimation indicates a second probability on whether the sound field comprises speech or on whether the sound field does not comprise speech, wherein estimating the speech probability estimation is conducted based on the speech probability information and based on one or more acoustic sensor signals, which depend on the sound field, and outputting the speech probability estimation by an output interface, wherein at least one of the first speech probability estimator and the second speech probability estimator and the output interface is implemented using a hardware apparatus or a computer or a combination of a hardware apparatus and a computer.

19. A non-transitory computer-readable medium comprising a computer program for implementing a method for providing a speech probability estimation when being executed on a computer or signal processor, wherein the method comprises:

estimating speech probability information by a first speech probability estimator, wherein the speech probability information indicates a first probability on whether a sound field of a scene comprises speech or on whether the sound field of the scene does not comprise speech, wherein estimating the speech probability information is conducted based on at least spatial information about the sound field or spatial information on the scene, estimating the speech probability estimation by a second speech probability estimator, wherein the speech probability estimation indicates a second probability on whether the sound field comprises speech or on whether the sound field does not comprise speech, wherein estimating the speech probability estimation is conducted based on the speech probability information and based on one or more acoustic sensor signals, which depend on the sound field, and outputting the speech probability estimation by an output interface.

* * * * *